(12) United States Patent
Wang et al.

(10) Patent No.: US 12,024,166 B2
(45) Date of Patent: Jul. 2, 2024

(54) VEHICLE DRIVING CONTROL METHOD AND APPARATUS

(71) Applicant: Apollo Intelligent Connectivity (Beijing) Technology Co., Ltd., Beijing (CN)

(72) Inventors: Xingyu Wang, Beijing (CN); Ning Yu, Beijing (CN); Jingjing Xue, Beijing (CN)

(73) Assignee: APOLLO INTELLIGENT CONNECTIVITY (BEIJING) TECHNOLOGY CO., LTD., Beijing (CN)

( * ) Notice: Subject to any disclaimer, the term of this patent is extended or adjusted under 35 U.S.C. 154(b) by 375 days.

(21) Appl. No.: 17/572,526

(22) Filed: Jan. 10, 2022

(65) Prior Publication Data

US 2022/0126822 A1    Apr. 28, 2022

(30) Foreign Application Priority Data

Apr. 16, 2021   (CN) .......................... 202110414485.9

(51) Int. Cl.
  *B60W 30/095* (2012.01)
  *B60W 60/00* (2020.01)
(52) U.S. Cl.
  CPC .... *B60W 30/0956* (2013.01); *B60W 60/0027* (2020.02); *B60W 2520/10* (2013.01);
  (Continued)
(58) Field of Classification Search
  CPC ......... B60W 30/0956; B60W 60/0027; B60W 2520/10; B60W 2520/105;
  (Continued)

(56) References Cited

U.S. PATENT DOCUMENTS 10,916,130 B2   2/2021 Zhu
2015/0141056 A1*  5/2015 Fefilatyev ............. H04W 4/021
                                                        455/456.3
(Continued)

FOREIGN PATENT DOCUMENTS

CN          105549597 A     5/2016
CN          109774714 A     5/2019
(Continued)

OTHER PUBLICATIONS

First Office Action of the priority application CN202110414485.9.
(Continued)

*Primary Examiner* — Yuen Wong
(74) *Attorney, Agent, or Firm* — J.C. PATENTS

(57) ABSTRACT

Provided are a vehicle driving control method and apparatus. The method includes: determining, according to driving data of a vehicle, at least one piece of candidate speed information of the vehicle, the candidate speed information is used to indicate traveling speed of the vehicle at each moment in a first preset time period; predicting, according to movement data of an obstacle on a road, an obstacle trajectory of the obstacle in the first preset time period; determining right-of-way information corresponding to the obstacle trajectory, the right-of-way information is used to indicate a priority in traveling of the vehicle and the obstacle; and determining target speed information in the at least one piece of candidate speed information according to the right-of-way information corresponding to the obstacle trajectory and the obstacle trajectory, and controlling the vehicle to travel according to a route corresponding to the vehicle and the target speed information.

19 Claims, 13 Drawing Sheets

(52) U.S. Cl.
CPC ... *B60W 2520/105* (2013.01); *B60W 2520/12* (2013.01); *B60W 2520/125* (2013.01); *B60W 2552/05* (2020.02); *B60W 2554/4042* (2020.02); *B60W 2554/4043* (2020.02); *B60W 2554/801* (2020.02); *B60W 2554/802* (2020.02); *B60W 2555/60* (2020.02); *B60W 2720/10* (2013.01); *B60W 2720/12* (2013.01)

(58) Field of Classification Search
CPC ....... B60W 2520/12; B60W 2520/125; B60W 2552/05; B60W 2554/4042; B60W 2554/4043; B60W 2554/801; B60W 2554/802; B60W 2555/60; B60W 2720/10; B60W 2720/12; B60W 30/143; B60W 30/18159; B60W 2554/4041; B60W 2554/4044; B60W 2556/50; B60W 50/0097; B60W 2720/103; B60W 60/0011

See application file for complete search history.

(56) References Cited

U.S. PATENT DOCUMENTS

| | | | |
|---|---|---|---|
| 2016/0364989 A1* | 12/2016 | Speasl | B64C 39/024 |
| 2017/0166204 A1 | 6/2017 | Yoo | |
| 2017/0235310 A1 | 8/2017 | Miyake | |
| 2017/0320500 A1 | 11/2017 | Yoo | |
| 2018/0150764 A1* | 5/2018 | Stenneth | G01C 21/00 |
| 2018/0174446 A1* | 6/2018 | Wang | G08G 1/0112 |
| 2018/0345963 A1 | 12/2018 | Maura | |
| 2019/0049970 A1 | 2/2019 | Djuric | |
| 2019/0291726 A1 | 9/2019 | Shalev-Shwartz | |
| 2019/0317515 A1 | 10/2019 | Zhang | |
| 2020/0156631 A1 | 5/2020 | Lin | |
| 2020/0269873 A1 | 8/2020 | Liu | |
| 2020/0290642 A1 | 9/2020 | Hao | |

FOREIGN PATENT DOCUMENTS

| | | |
|---|---|---|
| CN | 109801508 A | 5/2019 |
| CN | 109814576 | 5/2019 |
| CN | 110293968 A | 10/2019 |
| CN | 111123933 A | 5/2020 |
| CN | 111127908 A | 5/2020 |
| CN | 111429738 A | 7/2020 |
| CN | 111791879 A | 10/2020 |
| CN | 112498366 A | 3/2021 |
| CN | 112526999 A | 3/2021 |
| DE | 102018109883 A1 | 12/2018 |
| EP | 3683782 A1 | 7/2020 |
| JP | 2000207691 A | 7/2000 |
| JP | 2010287109 A | 12/2010 |
| JP | 2015058890 A | 3/2015 |
| JP | 2017144857 A | 8/2017 |
| JP | 2020132149 A | 8/2020 |

OTHER PUBLICATIONS

Extended European Search Report of the parallel application EP22151035.7.
First Office Action of the parallel application JP2022-003035.
Notice of Allowance of the priority application CN202110414485.9.

* cited by examiner

VEHICLE DRIVING CONTROL METHOD AND APPARATUS

CROSS-REFERENCE TO RELATED APPLICATION

This application claims priority to Chinese Patent Application No. 202110414485.9, filed on Apr. 16, 2021, which is hereby incorporated by reference in its entirety.

TECHNICAL FIELD

The present application relates to the field of autonomous driving in computer technology, and in particular, to a vehicle driving control method and apparatus.

BACKGROUND

With the continuous development of autonomous driving technology, current autonomous vehicles are capable of planning their travel trajectory and traveling speed.

At present, in case of planning the travel trajectory and traveling speed of an autonomous vehicle, usually, the travel trajectory of the obstacle on the road is predicted, and then, based on the safety principle, the traveling speed that does not collide with the obstacle is selected according to the determined obstacle trajectory. If it is determined after calculation that there is always a risk of collision between the autonomous vehicle and the obstacle, the autonomous vehicle will be braked to a stop to avoid the obstacle.

SUMMARY

The present application provides a vehicle driving control method and apparatus.

According to a first aspect of the present application, there is provided a vehicle driving control method, including:
  determining, according to driving data of a vehicle, at least one piece of candidate speed information of the vehicle, where the candidate speed information is used to indicate traveling speed of the vehicle at each moment in a first preset time period;
  predicting, according to movement data of an obstacle on a road, an obstacle trajectory of the obstacle in the first preset time period;
  determining right-of-way information corresponding to the obstacle trajectory, where the right-of-way information is used to indicate a priority in traveling of both the vehicle and the obstacle; and
  determining target speed information in the at least one piece of candidate speed information according to both the right-of-way information corresponding to the obstacle trajectory and the obstacle trajectory, and controlling the vehicle to travel according to both a route corresponding to the vehicle and the target speed information.

According to a second aspect of the present application, there is provided a vehicle driving control device, including:
  a first determination module, configured to determine, according to driving data of a vehicle, at least one piece of candidate speed information of the vehicle, where the candidate speed information is used to indicate traveling speed of the vehicle at each moment in a first preset time period;
  a prediction module, configured to predict, according to movement data of an obstacle on a road, an obstacle trajectory of the obstacle in the first preset time period;
  a second determination module, configured to determine right-of-way information corresponding to the obstacle trajectory, where the right-of-way information is used to indicate a priority in traveling of both the vehicle and the obstacle; and
  a third determination module, configured to determine target speed information in the at least one piece of candidate speed information according to both the right-of-way information corresponding to the obstacle trajectory and the obstacle trajectory, and control the vehicle to travel according to both a route corresponding to the vehicle and the target speed information.

According to a third aspect of the present application, there is provided an electronic device, including:
  at least one processor; and
  a memory communicatively connected with the at least one processor; where
  the memory stores instructions executable by the at least one processor, and the instructions are executed by the at least one processor to enable the at least one processor to perform the method according to the first aspect.

According to a fourth aspect of the present application, there is provided a non-transitory computer-readable storage medium having stored therein computer instructions, where the computer instructions are used to cause a computer to perform the method according to the first aspect.

According to a fifth aspect of the present application, there is provided a computer program product, including: a computer program stored in a readable storage medium, and at least one processor of an electronic device can read the computer program from the readable storage medium, and then executes the computer program to cause the electronic device to perform the method according to the first aspect.

It should be understood that what is described herein is not intended to identify the key or important features of the embodiments of the present application, nor is it intended to limit the scope of the present application. Other features of the present application will be readily understood from the following description.

BRIEF DESCRIPTION OF THE DRAWINGS

The accompanying drawings are for better understanding of the solution and do not constitute a limitation to the present application, in which.

DESCRIPTION OF EMBODIMENTS

Figure 1:
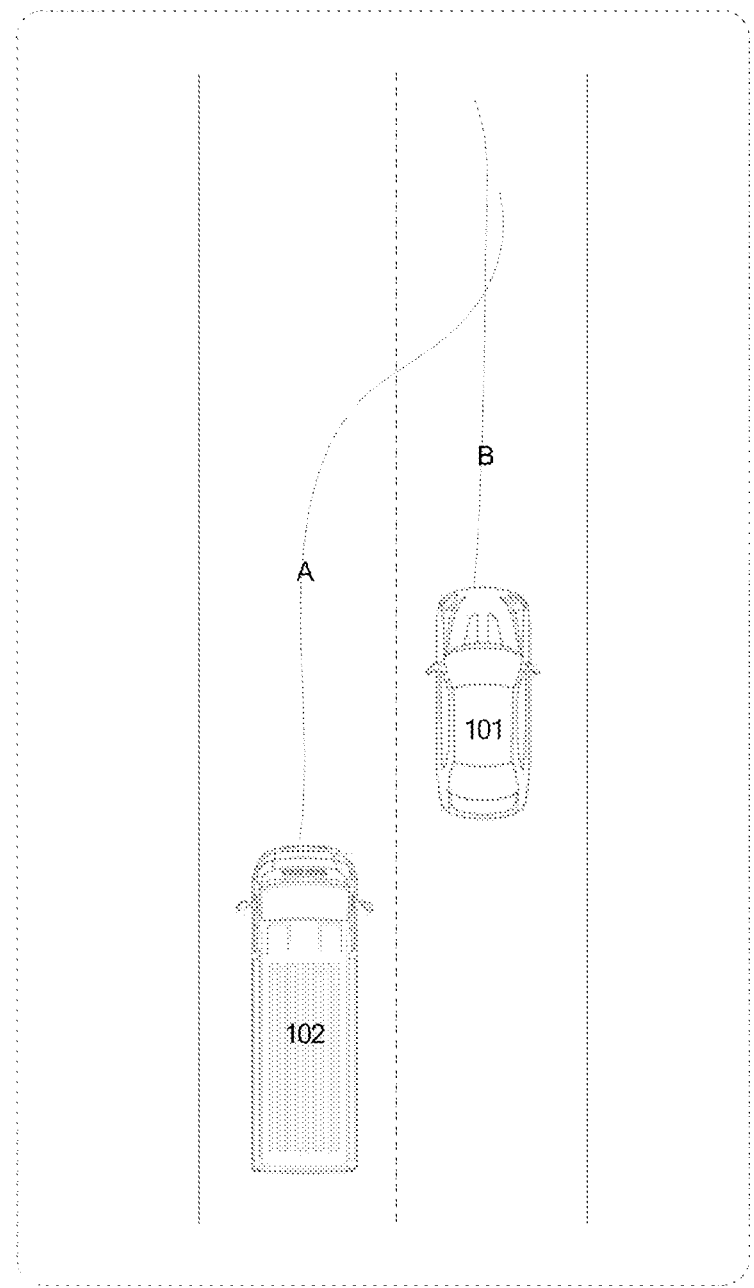
FIG. 1 is a schematic diagram of intersection of an obstacle prediction line and a vehicle trajectory line according to an embodiment of the present application.

The exemplary embodiments of the present application are described below with reference to the accompanying drawings, including various details of the embodiments of the present application that are useful for understanding the present application, and should be considered as merely exemplary. Therefore, those of ordinary skill in the art should realize that various changes and modifications can be made to the embodiments described herein without departing from the scope and spirit of the present application. Likewise, for clarity and conciseness, descriptions of well-known functions and structures are omitted below.

In order to better understand the technical solution of the present application, firstly, the related technologies involved in the present application will be further introduced in detail.

An autonomous vehicle refers to a vehicle that travels in an autonomous driving mode, such as a self-driving vehicle. The autonomous vehicle is capable of freeing the driver from some driving-related duties, so that the autonomous vehicle can travel with minimal human-computer interaction.

In the field of autonomous driving, the first problem is driving safety, and with the continuous development of autonomous driving technology, both the user's riding experience and the driving rationality of the autonomous vehicle are also particularly important while paying attention to the driving safety of autonomous vehicle. The performance of riding experience comprehensively reflects the comfort and intelligence of the autonomous vehicle, while the driving rationality is an important index for evaluating autonomous driving capabilities. The autonomous vehicle with driving rationality should follow the traffic rules as well like the human driver, and make reasonable decisions about passing and yield during a driving process.

In the current traffic laws, the priority of road traffic is stipulated, which is defined as the right-of-way in the present application.

At present, during the driving process, the autonomous vehicle will plan the route and speed, which can be collectively referred to as trajectory planning, and the route is contained in the trajectory. In other words, when a route is selected, corresponding speed is also selected at the same time, that is to say, a position on the route that will be reached at time t will be selected, so as to control the autonomous vehicle to travel according to the planned trajectory. During the planning process of driving, it is necessary to avoid obstacles on the road.

In related technologies, determination of the obstacle trajectory is mainly based on the obstacle prediction line provided by the prediction module, then the traveling speed that will not collide with all obstacles within a period of time is selected as the speed line of the autonomous vehicle based on the safety principle, and finally, the vehicle is controlled to travel according to the travel route and traveling speed.

If it is found through calculations that there is always a risk of collision between the vehicle and the obstacle, the autonomous vehicle will be braked to a stop or travel at decreasing speed to avoid the obstacle.

However, the obstacle prediction line may be inconsistent with the actual obstacle trajectory. Since the speed planning result of the autonomous vehicle completely depends on the result of the obstacle prediction line, if the obstacle prediction line is unreasonable or is inconsistent with the actual situation, it will cause the autonomous vehicle to make an incorrect speed plan, which is manifested as unreasonable braking.

For example, it can be understood with reference to FIG. 1, which is a schematic diagram of intersection of an obstacle prediction line and a vehicle trajectory line according to an embodiment of the present application.

As shown in FIG. 1, the autonomous vehicle may be 101 in FIG. 1, and the obstacle vehicle may be, for example, 102 in FIG. 1. The current autonomous vehicle 101 predicts the trajectory of the obstacle vehicle in 8 seconds, for example, the trajectory line A is got, and the trajectory line B can be got, for example, according to the planned speed and planned route of the autonomous vehicle within 8 seconds.

Referring to FIG. 1, it can be determined that the result of the obstacle prediction line A shows that the obstacle vehicle 102 will be in front of the autonomous vehicle 101 in 8 seconds, blocking the forward lane of the autonomous vehicle 101, and the autonomous vehicle will slow down and yield based on this result to avoid a collision. In fact, the obstacle vehicle 102 will determine the traveling state of the autonomous vehicle 101 and perform lane changing and overtaking processing according to the right of way.

For example, the current situation shown in FIG. 1 is that the autonomous vehicle 101 is going straight, and the obstacle vehicle 102 is required to overtake from the left side of the autonomous vehicle and change the lane. Since the lane-changing vehicle has a lower right-of-way than the straight-going vehicle, the obstacle vehicle 102 will actually choose to travel at accelerating speed in its own route, by a safe distance, until exceeding the autonomous vehicle 101, and then choose to change the lane to enter into the lane of the autonomous vehicle 101. Therefore, when the obstacle vehicle 102 is located behind the self-driving vehicle 101 shown in FIG. 1, it will not directly cut in, so there will be no collision after 8 seconds. In this case, the deceleration plan made by the autonomous vehicle lacks rationality.

Based on the above introduction, it can be determined that in the implementation of related technologies, the obstacle prediction line may be inconsistent with the actual obstacle trajectory, part of the reason is that in the actual scenario, it is assumed that the obstacle is a vehicle, then the human driver driving the obstacle vehicle is in control of the right-of-way rules. When the obstacle vehicle has a higher priority in traveling, the obstacle vehicle may choose to pass at accelerating speed; when the obstacle vehicle has a lower priority in traveling, the obstacle vehicle may choose a right time to pass. Another part of the reason is that the current obstacle prediction line may not be accurate.

Therefore, depending on the obstacle prediction line completely for speed planning lacks of rationality in the vehicle speed planning. For example, unreasonable deceleration and braking of autonomous vehicle will result in a lack of driving rationality. In turn, the vehicle traveling lacks rationality.

For the problems in the prior art, the present application proposes the following technical idea: by adding right-of-way information (the right-of-way information can indicate the priority in traveling of both the vehicle and the obstacle) to the predicted obstacle trajectory; then planning, according to the right-of-way information corresponding to the obstacle trajectory, the traveling speed of the vehicle, and controlling the vehicle to travel according to the planned traveling speed, so as to avoid unreasonable deceleration and braking of the autonomous vehicle, thereby effectively improving the driving rationality.

The following describes the vehicle driving control method provided by the present application in combination with specific embodiments. It is worth noting that the execution body of each embodiment in the present application may be, for example, a processor inside an autonomous vehicle, or may also be an external processor, server and other devices, which is not limited in the present application. As long as the execution body has the functions of data processing and data sending and receiving, it can be selected as required.

Figure 2:
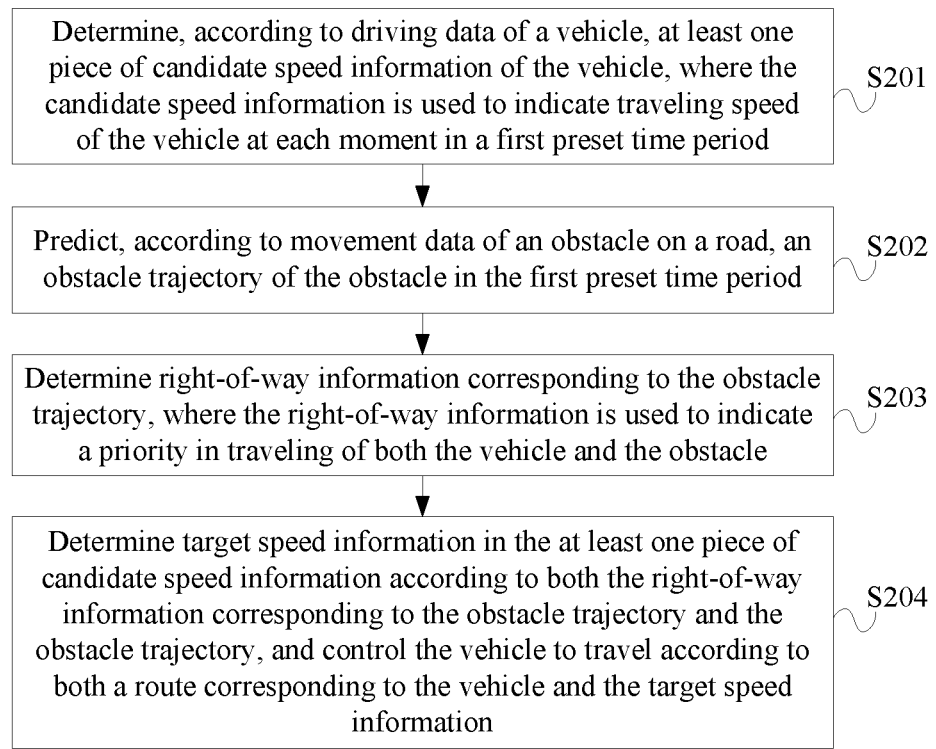
FIG. 2 is flowchart I of a vehicle driving control method according to an embodiment of the present application.

The following describes the vehicle driving control method according to the embodiment of the present application with reference to FIG. 2, which is flowchart I of a vehicle driving control method according to an embodiment of the present application.

As shown in FIG. 2, the method includes:

S201, determine, according to driving data of a vehicle, at least one piece of candidate speed information of the vehicle, where the candidate speed information is used to indicate traveling speed of the vehicle at each moment in a first preset time period.

The vehicle in this embodiment may refer to an autonomous vehicle. In a possible implementation, the driving data of the vehicle may include, for example, current speed of the vehicle, a minimum acceleration of the vehicle, a maximum acceleration of the vehicle, etc., and the driving data of the vehicle is used to determine the candidate speed information of the vehicle. This embodiment does not limit the specific implementation of the driving data of the vehicle, and the driving data of the vehicle may also include, for example, a driving direction of the vehicle, a position of the vehicle, etc. All data related to the vehicle traveling can be used as the driving data in this embodiment, which can be selected as required.

In this embodiment, the traveling speed of the vehicle is required to be planned to ensure the safety of the vehicle. Therefore, in this embodiment, at least one piece of candidate speed information of the vehicle can be determined according to the driving data of the vehicle, and the candidate speed information can indicate the traveling speed of the vehicle at each moment in the first preset time period. For example, the first preset time period is 8 seconds. It is assumed that the currently determined candidate speed information includes candidate speed information 1 and candidate speed information 2, the candidate speed information 1 can indicate the traveling speed of the vehicle at each moment in the 8 seconds, and the same is true of the candidate speed information 2, only that the traveling speed of the vehicle indicated by the candidate speed information 1 is different from that indicated by the candidate speed information 2.

In a possible implementation, the driving data of the vehicle may include the current vehicle speed, the minimum acceleration of the vehicle and the maximum acceleration of the vehicle, then the travel speed that the vehicle can reach at each moment can be determined based on the driving data, and at least one piece of candidate speed information of the vehicle can be got afterwards upon a certain combination of these speeds. This embodiment does not limit the specific implementation of the vehicle speed specifically contained in the candidate speed information, which can be determined as required.

S202, predict, according to movement data of an obstacle on a road, an obstacle trajectory of the obstacle in the first preset time period.

In this embodiment, it is also necessary to predict the obstacle trajectory on the road. The obstacle on the road may include, for example, a vehicle, a pedestrian, etc. This embodiment does not limit the specific implementation of the obstacle, and any object that is required to be avoided by the autonomous vehicle can be used as an obstacle in this embodiment.

In this embodiment, the obstacle trajectory in the first preset time period can be predicted based on the movement data of the obstacle on the road. It is worth noting that real-time road conditions are required to be considered in the driving planning, so it is always necessary to plan the trajectory in recent times. For example, in this embodiment, the trajectory in the first preset time period is predicted, and when the speed is planned as described above, the at least one piece of candidate speed information in the first preset time period is also determined. The duration of the first preset time period can be selected as required. For example, it can be 8 seconds, or it can also be other time periods, and this embodiment does not limit thereto.

In a possible implementation, for example, the movement data of the obstacle can be obtained through the sensing sensor in the autonomous vehicle, and the movement data of obstacle e may include at least one of the following: the obstacle position, obstacle speed, and obstacle travel direction. In the actual implementation, the movement data of the obstacle may also be selected and expanded as required. Any obstacle-related data used to predict the obstacle trajectory can be used as the movement data in this embodiment.

In case of predicting an obstacle trajectory according to movement data of an obstacle on a road, for example, the prediction unit in the autonomous vehicle can be adopted, and the prediction unit may include a specific prediction algorithm implementation, or a specific prediction model. This embodiment does not limit the specific implementation of the obstacle trajectory prediction, which can be set as required.

In the possible implementation of this embodiment, multiple obstacles can exist on the road, and then the trajectory corresponding to each obstacle can be predicted separately, so as to obtain the obstacle trajectory corresponding to each obstacle.

S203, determine right-of-way information corresponding to the obstacle trajectory, where the right-of-way information is used to indicate a priority in traveling of both the vehicle and the obstacle.

After determining the obstacle trajectory, the right-of-way information corresponding to the obstacle trajectory can be determined. In this embodiment, the right-of-way information can indicate the priority in traveling of both the vehicle and the obstacle. For example, the right-of-way information corresponding to the current obstacle trajectory may indicate that the vehicle has a higher priority, or it may indicate that the obstacle has a higher priority.

In the process of determining the right-of-way information, for example, the corresponding right-of-way information can be determined according to the current position of the autonomous vehicle and the current position of the obstacle, as well as the driving rules on the road. It is understandable that there will be many driving scenarios during driving, such as going straight, overtaking, turning, etc., and the corresponding right-of-way information can be determined according to the rules corresponding to these actual scenarios.

Also in a possible implementation, the right-of-way information corresponding to each obstacle trajectory can be determined respectively for multiple obstacles existing on the road.

S204, determine target speed information in the at least one piece of candidate speed information according to both the right-of-way information corresponding to the obstacle trajectory and the obstacle trajectory, and control the vehicle to travel according to both a route corresponding to the vehicle and the target speed information.

After determining the right-of-way information corresponding to the obstacle trajectory, the target speed information can be determined in the at least one piece of candidate speed information according to the right-of-way information and the obstacle trajectory. The principle for determining the target speed information in this embodiment may be, for example, when an autonomous vehicle travels according to the target speed information, it will not collide with the obstacle on the road.

For example, based on the obstacle trajectory, it can be determined whether the obstacle trajectory and the travel trajectory of the autonomous vehicle intersect; if yes, obstacle avoidance is something that the vehicle is required to consider. Afterwards, in the process of determining the target speed information of the autonomous vehicle, the right-of-way information can instruct the autonomous vehicle, whether it is required to slow down and whether it is required to yield; for example, the current right-of-way information indicates that the autonomous vehicle has a higher priority in traveling. However, when the right-of-way information is not considered in the related technology, the autonomous vehicle may eventually choose the target speed information of deceleration or yielding because of the risk of collision with obstacles. As a result, the autonomous vehicle makes unreasonable deceleration or braking.

However, in this embodiment, the target speed information is determined according to the right-of-way information, so that target speed information with better driving performance, instead of the speed information of decelerating or yielding, can be selected when the autonomous vehicle has a higher priority in traveling, which prevents the autonomous vehicle from making unreasonable deceleration or braking, and effectively improves the rationality of driving planning of autonomous vehicles.

After determining the target speed information, the vehicle can be controlled to travel according to the corresponding route and target speed information of the vehicle. It is understandable that the route of the vehicle indicates the travel direction of the vehicle, and the target speed information of the vehicle indicates the traveling speed at each moment on this route.

On the same route, the vehicle may collide with the obstacle at certain speeds, and may not collide with the obstacle at other speeds. Therefore, in this embodiment, when the route that the vehicle may follow has been determined, the traveling speed of the vehicle shall be planned, to ensure that the vehicle will not collide with the obstacle, and unnecessary deceleration and yielding will not be caused.

The route that the vehicle may follow, for example, is determined based on the vehicle's starting point and destination point and road conditions. This embodiment does not limit the specific way of determining the route of the vehicle, which can refer to the implementation of related route planning, and will not be repeated herein.

The vehicle driving control method provided by the embodiment of the present application includes: determining, according to driving data of a vehicle, at least one piece of candidate speed information of the vehicle, where the candidate speed information is used to indicate traveling speed of the vehicle at each moment in a first preset time period; predicting, according to movement data of an obstacle on a road, an obstacle trajectory of the obstacle in the first preset time period; determining right-of-way information corresponding to the obstacle trajectory, where the right-of-way information is used to indicate a priority in traveling of both the vehicle and the obstacle; and determining target speed information in the at least one piece of candidate speed information according to both the right-of-way information corresponding to the obstacle trajectory and the obstacle trajectory, and controlling the vehicle to travel according to both a route corresponding to the vehicle and the target speed information. By indicating, through the right-of-way information corresponding to the obstacle trajectory, the priority in traveling of both the vehicle and the obstacle, in case of determining the speed of a traveling vehicle of an autonomous, the target speed information is selected from the at least one piece of candidate speed information according to the right-of-way information and obstacle trajectory, so that unnecessary deceleration and yielding of the autonomous vehicle can be avoided, which effectively improves the driving rationality of the autonomous vehicle.

Figure 3:
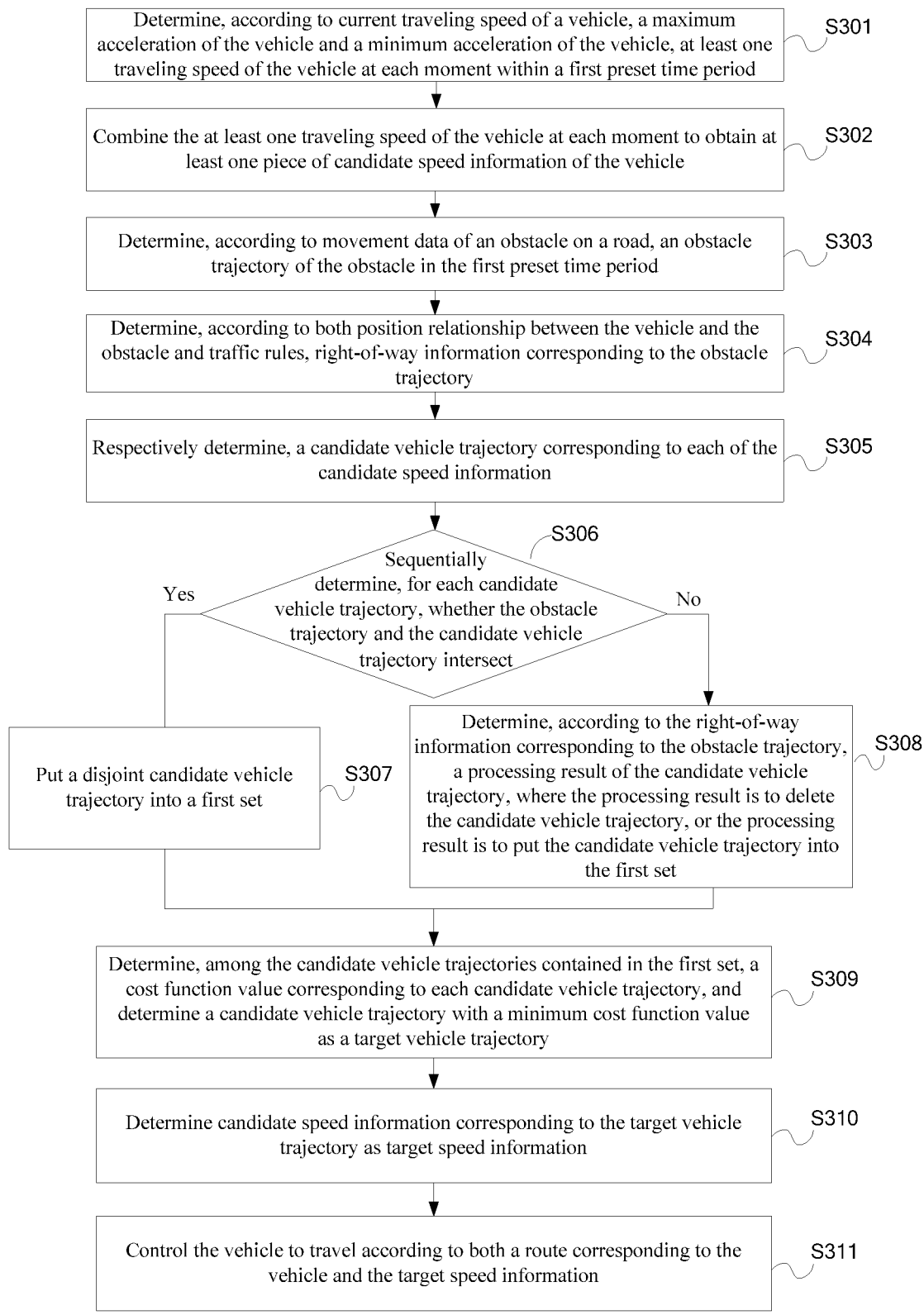
FIG. 3 is flowchart II of a vehicle driving control method according to an embodiment of the present application.
Figure 4:
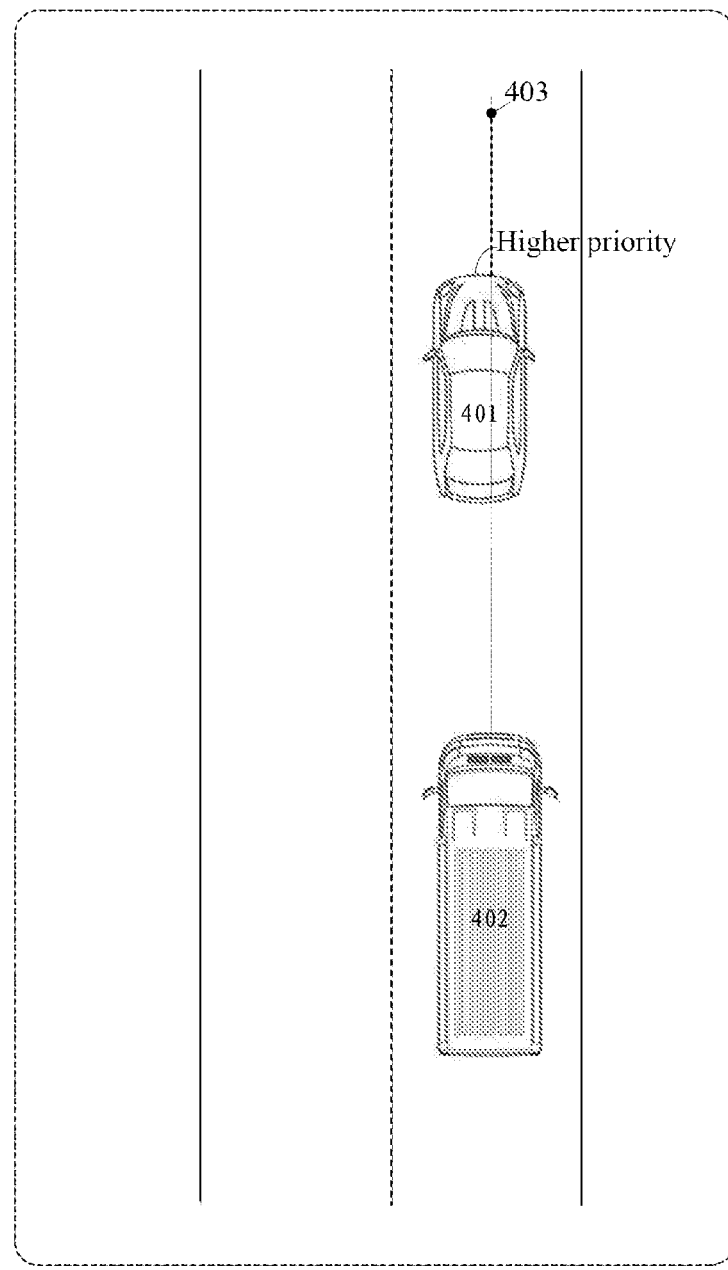
FIG. 4 is schematic diagram I of implementation of determining right-of-way information for a non-intersection road according to an embodiment of the present application.
Figure 5:
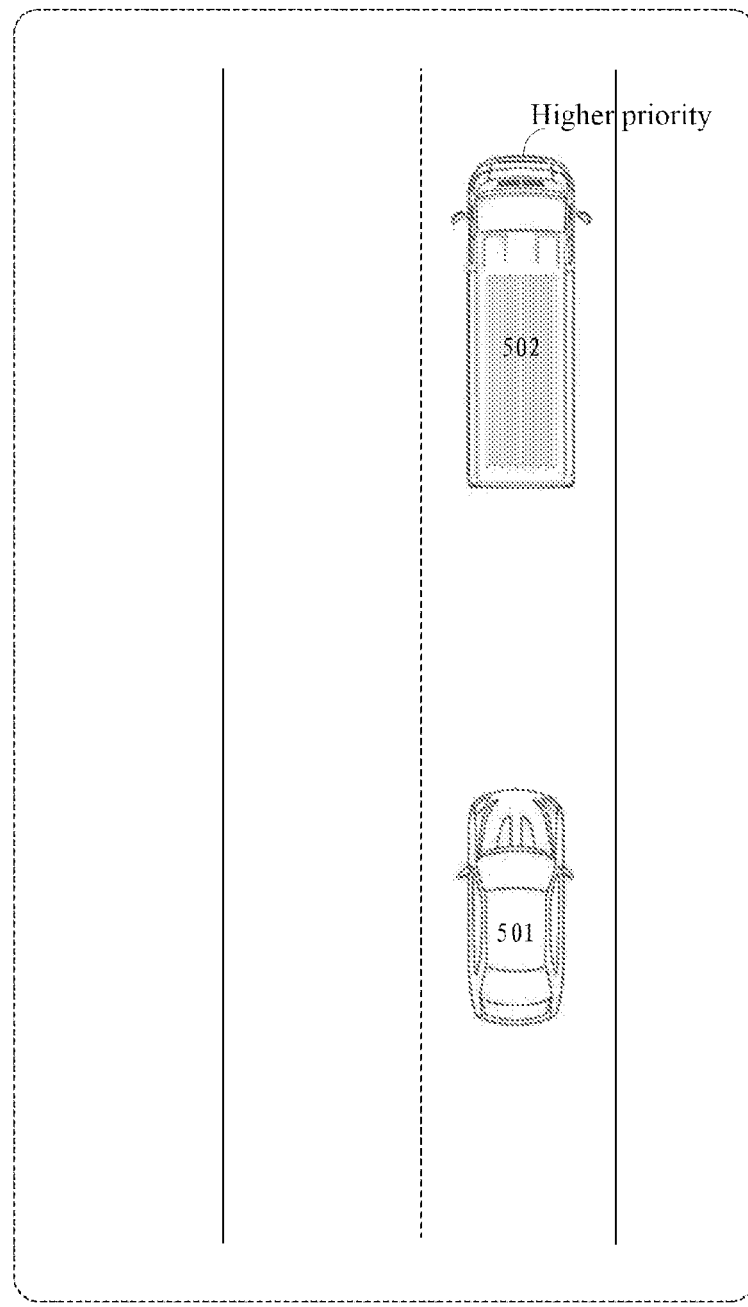
FIG. 5 is schematic diagram II of implementation of determining right-of-way information for a non-intersection road according to an embodiment of the present application.
Figure 6:
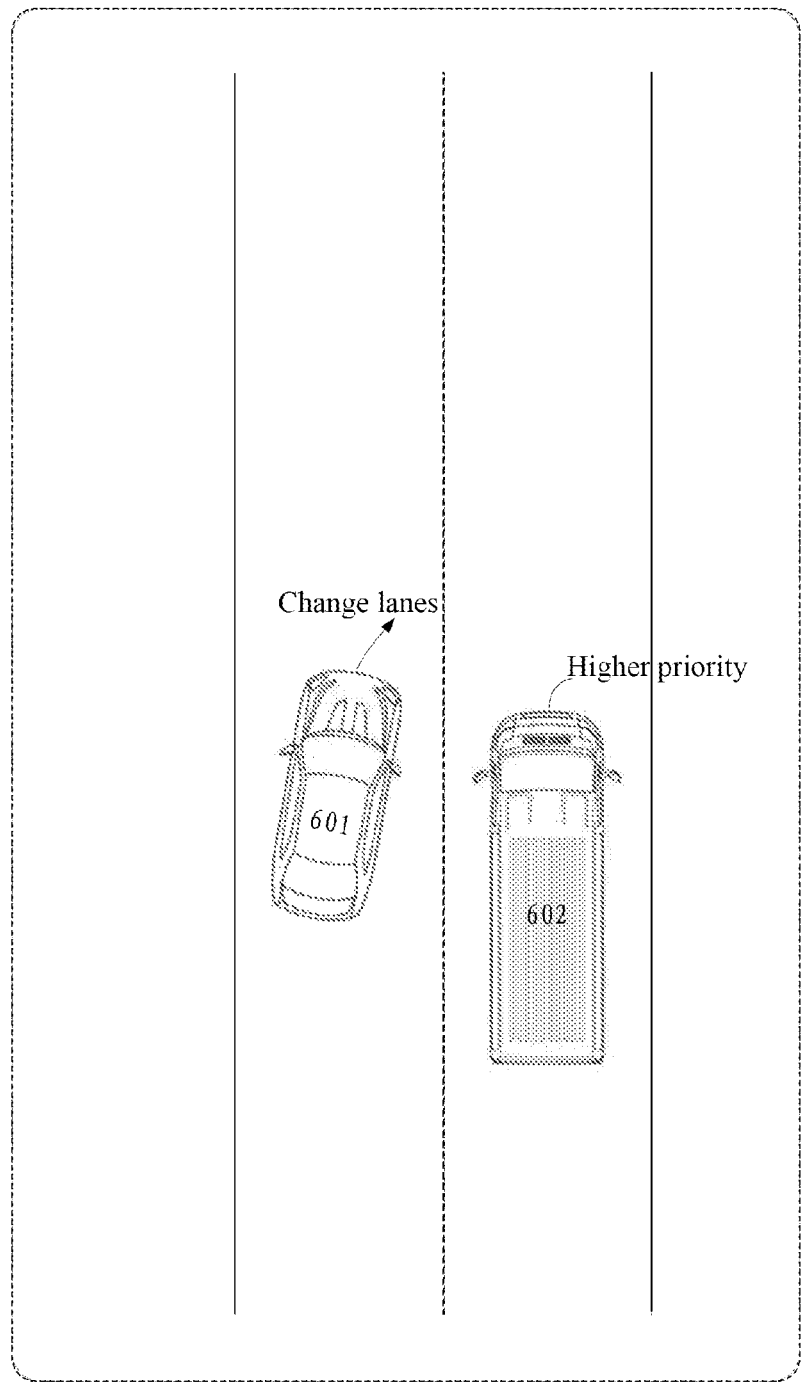
FIG. 6 is schematic diagram III of implementation of determining right-of-way information for a non-intersection road according to an embodiment of the present application.
Figure 7:
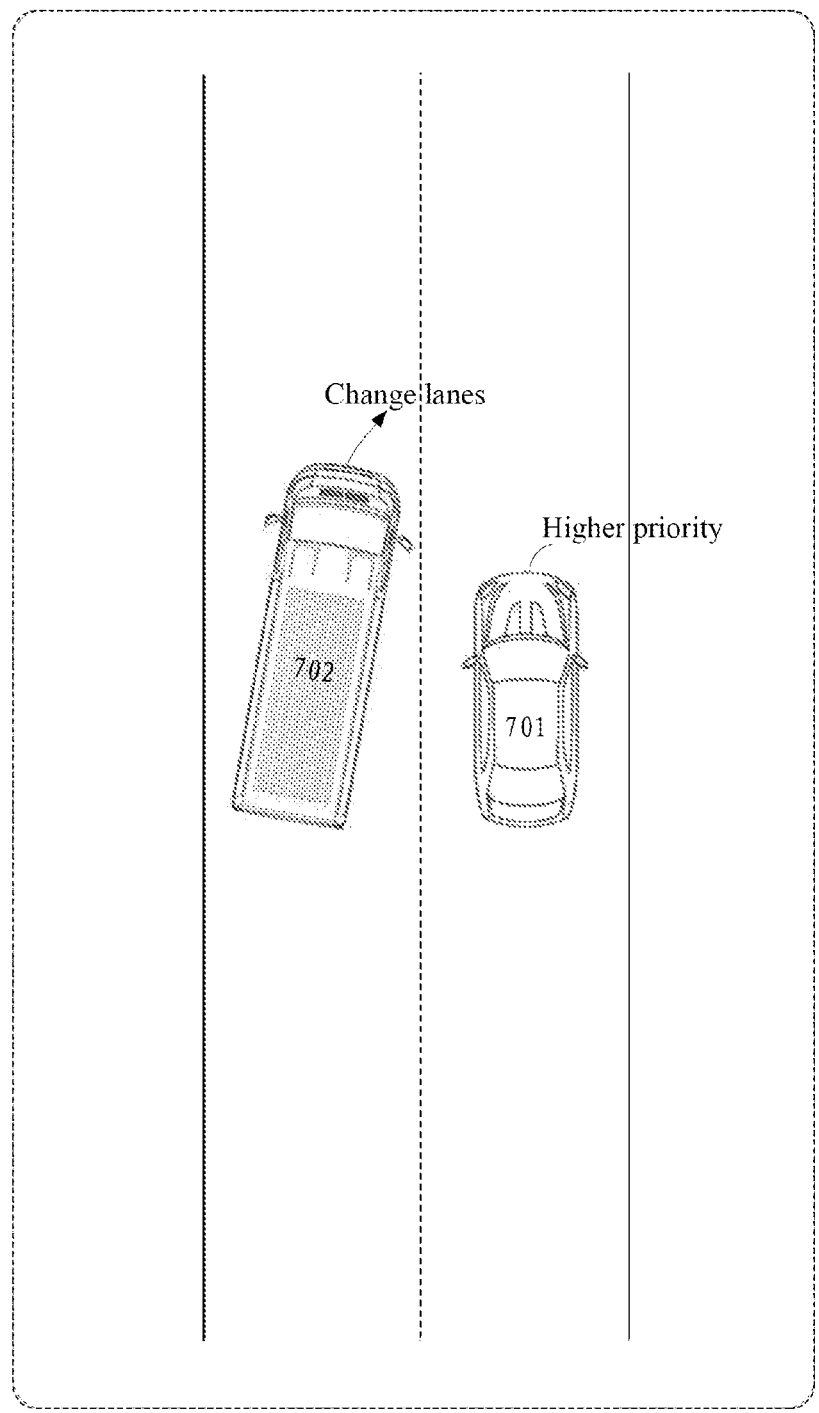
FIG. 7 is schematic diagram IV of implementation of determining right-of-way information for a non-intersection road according to an embodiment of the present application.
Figure 8:
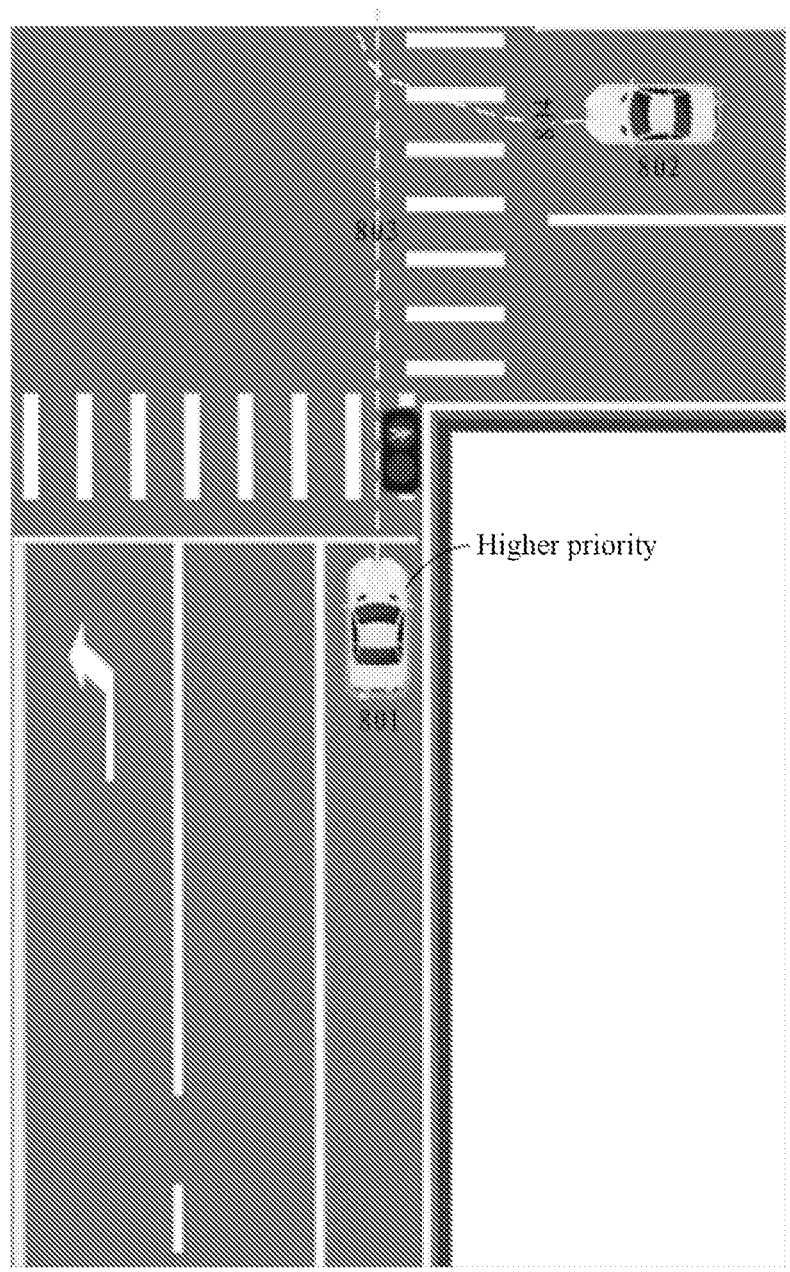
FIG. 8 is a schematic diagram of implementation of determining right-of-way information for a road at intersections according to an embodiment of the present application.
Figure 9:
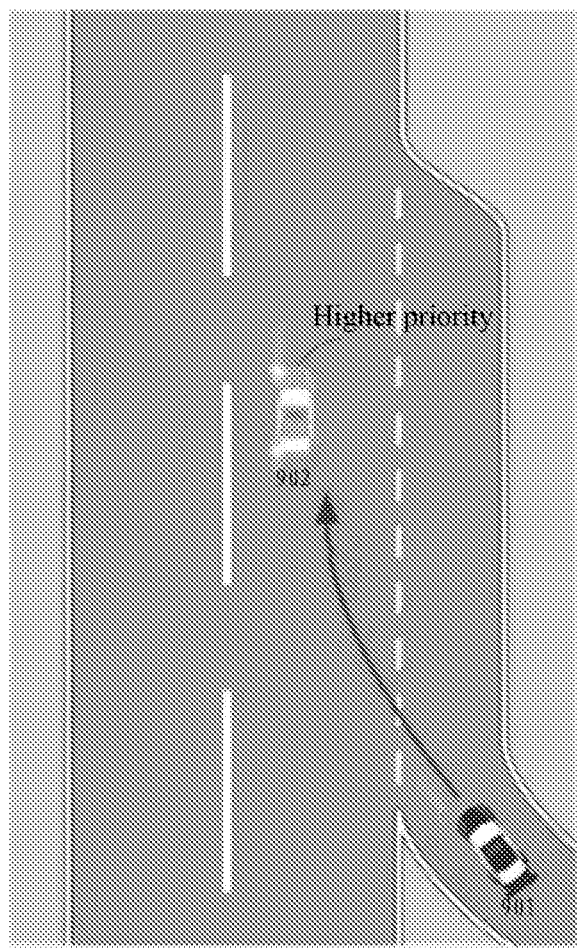
FIG. 9 is schematic diagram I of implementation of determining right-of-way information for a merging intersection according to an embodiment of the present application.
Figure 10:
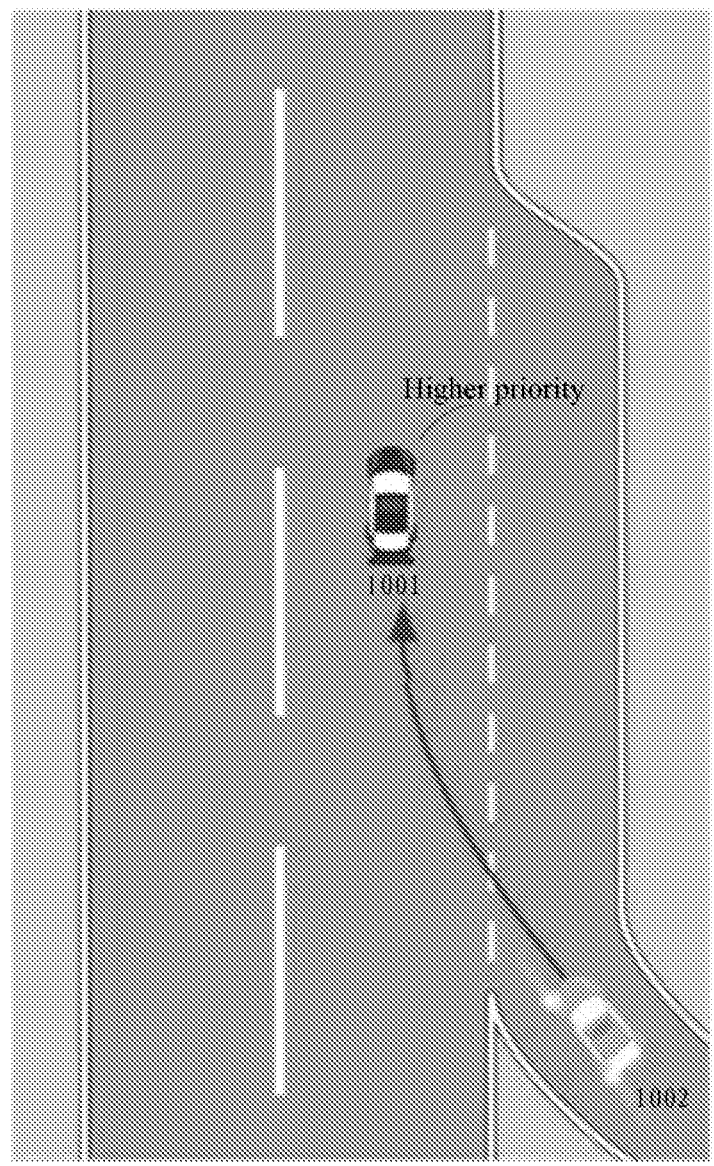
FIG. 10 is schematic diagram II of implementation of determining right-of-way information for a merging intersection according to an embodiment of the present application.
Figure 11:
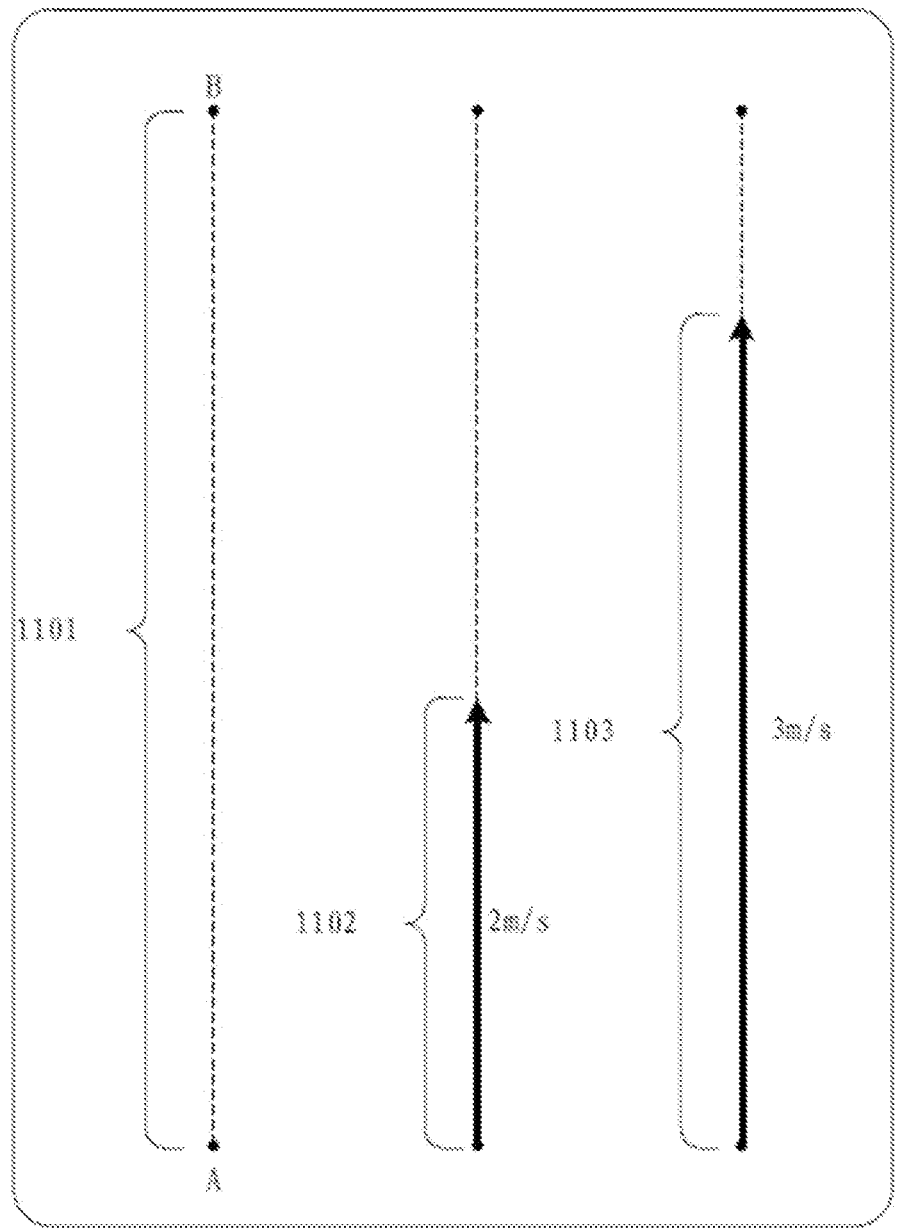
FIG. 11 is a schematic diagram of implementation of determining at least one candidate trajectory according to an embodiment of the present application.
Figure 12:
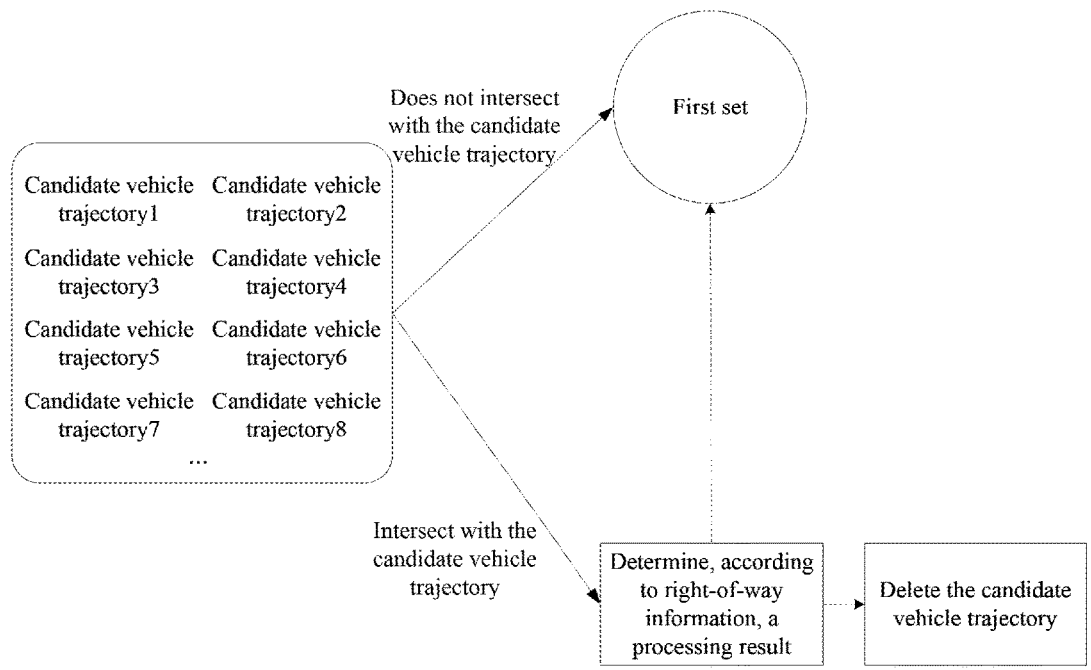
FIG. 12 is a schematic diagram of processing the candidate trajectory according to an embodiment of the present application.

On the basis of the above embodiment, the following is a further detailed description of the vehicle driving control method provided by the present application with reference to FIGS. 3 to 12. FIG. 3 is flowchart II of a vehicle driving control method according to an embodiment of the present application; FIG. 4 is schematic diagram I of implementation of determining right-of-way information for a non-intersection road according to an embodiment of the present application; FIG. 5 is schematic diagram II of implementation of determining right-of-way information for a non-intersection road according to an embodiment of the present application; FIG. 6 is schematic diagram III of implementation of determining right-of-way information for a non-intersection road according to an embodiment of the present application; FIG. 7 is schematic diagram IV of implementation of determining right-of-way information for a non-intersection road according to an embodiment of the present application; FIG. 8 is a schematic diagram of implementation of determining right-of-way information for a road at intersections according to an embodiment of the present application; FIG. 9 is schematic diagram I of implementation of determining right-of-way information for a merging intersection according to an embodiment of the present application; FIG. 10 is schematic diagram II of implementation of determining right-of-way information for a merging intersection according to an embodiment of the present application; FIG. 11 is a schematic diagram of implementation of determining at least one candidate trajectory according to an embodiment of the present application; and FIG. 12 is a schematic diagram of processing the candidate trajectory according to an embodiment of the present application.

As shown in FIG. 3, the method includes:

S301, determine, according to current traveling speed of a vehicle, a maximum acceleration of the vehicle and a minimum acceleration of the vehicle, at least one traveling speed of the vehicle at each moment within a first preset time period.

In this embodiment, the driving data of the vehicle may include the current traveling speed of the vehicle, the maximum acceleration of the vehicle, and the minimum acceleration of the vehicle, so that the at least one traveling speed of the vehicle at each moment within the first preset time period can be determined according to such information.

Here is an example. It is assumed that the current traveling speed of the vehicle is 2 m/s, the maximum acceleration is, for example, 3 m/s$^2$ and the minimum acceleration is 1 m/s$^2$, the acceleration can also have directions, and different directions represent the acceleration or deceleration of the vehicle. The traveling speed that the vehicle can reach at each moment within the first preset time period can be determined according to such information.

For example, the current traveling speed at time t is 2 m/s, the maximum acceleration is, for example, 3 m/s$^2$, and the minimum acceleration is 1 m/s$^2$, then the traveling speed that the vehicle can reach at time t+1 may include, but is not limited to: 2 m/s, 3 m/s, 4 m/s, 5 m/s, 1 m/s, 0 m/s, etc. Afterwards, based on the various traveling speeds that the vehicle can reach at t+1 and the maximum and minimum accelerations, the traveling speed that the vehicle can reach at t+2 can be determined. By continuing the above process, at least one traveling speed at each moment within the first preset time period can be obtained.

For example, 1 second may be used as a time, or 0.5 second may be used as a time, etc. The specific unit of the time is not limited in this embodiment.

S302, combine the at least one traveling speed of the vehicle at each moment to obtain at least one piece of candidate speed information of the vehicle.

After obtaining the at least one traveling speed at each moment, a certain combination of the obtained traveling speeds at each moment are performed, that is, at least one piece of candidate speed information of the vehicle can be obtained. For example, if a combination mode, in which the traveling speed at each moment is 2 m/s, is determined, such candidate speed information shows that the vehicle is traveling at a constant speed; alternatively, there can also be a combination mode, in which the traveling speed in the first few moments is 2 m/s, the traveling speed at the last few moments is 1 m/s, and such candidate speed information shows that the vehicle first travels at a constant speed, then decelerates, and then travels at a constant speed after deceleration. Therefore, in this embodiment, multiple traveling speeds of the vehicle at various moments are combined to obtain multiple pieces of candidate speed information of the vehicle.

S303, determine, according to movement data of an obstacle on a road, an obstacle trajectory of the obstacle in the first preset time period.

The implementation of S303 is similar to that of S202, and will not be repeated herein.

S304, determine, according to both position relationship between the vehicle and the obstacle and traffic rules, right-of-way information corresponding to the obstacle trajectory.

In this embodiment, the right-of-way information corresponding to the obstacle trajectory is determined according to both the position relationship between the vehicle and the obstacle and the traffic rules, where the position relationship can indicate the current traveling situation of both the vehicle and the obstacle on the road, and the traffic rules may indicate the priority on the road.

The position relationship can be determined according to both the current position of the obstacle and the current position of the vehicle, the position of the obstacle can be determined by the sensing sensor described above, and the position of the vehicle can be determined, for example, through a map and positioning module in the vehicle.

At the same time, it can be understood that in different countries or different regions, there are certain differences in the traffic rules, and there will be some subdivisions in the traffic rules for different driving scenarios. Therefore, in this embodiment, the attributes of the road where the vehicle is currently located can also be determined, and the current driving scenario can be determined according to the attributes of the road.

The road attribute, for example, can indicate that the vehicle is located at a non-intersection road, or the vehicle is located at a road at intersections having traffic lights, or the vehicle is located at a road at intersections without the traffic lights. The road attribute may be determined, for example, according to the high-definition map unit in the autonomous vehicle.

The following describes, in combination with several specific scenarios, possible implementations of determining the right-of-way information based on the position relationship and traffic rules.

In a possible scenario, for example, the autonomous vehicle is located in a normal non-intersection scenario, that is, both the autonomous vehicle and the obstacle are located in the non-intersection road, and multiple position relationships may be available between the autonomous vehicle and the obstacle.

In a possible implementation, for example, referring to FIG. 4, an autonomous vehicle 401 and an obstacle 402 may exist on the current road. The autonomous vehicle 401 is traveling straight on the road, and the obstacle vehicle 402 is located behind the autonomous vehicle 401 on the same road. In this case, the right-of-way information can be determined according to the traffic rules: the autonomous vehicle 401 has a higher priority.

There is a special case in this scenario. The current situation is that the obstacle vehicle is located behind the autonomous vehicle that is located in the route. In special cases, it may be possible to determine that the intersection between the obstacle trajectory and the vehicle trajectory is directly in front of the autonomous vehicle, and this is the case shown in FIG. 4. The current trajectory intersection of the autonomous vehicle 401 and the obstacle vehicle 402 is, for example, shown as 403 in FIG. 4, and it can be seen that this trajectory intersection is directly in front of the autonomous vehicle 402.

This case shows that the obstacle vehicle 402 overtakes the autonomous vehicle 401 from behind, so it is located in front of the autonomous vehicle. But in fact, this will not occur. Therefore, in this special case, for example, this part of the obstacle prediction line can be ignored, and then the speed planning is continued based on the predicted trajectory of the remaining obstacles on the road.

In another possible implementation, for example, referring to FIG. 5, the autonomous vehicle 501 and the obstacle vehicle 502 are available on the current road, the autonomous vehicle 501 is going straight on the road, and the obstacle vehicle 502 is located in front of the autonomous vehicle 501 that is located in the same route. In this case, the right-of-way information can be determined according to the traffic rules: the obstacle vehicle 502 a higher the priority.

In another possible implementation, for example, referring to FIG. 6, the autonomous vehicle 601 and the obstacle vehicle 602 are available on the current road, the autonomous vehicle 601 changes lanes, and the obstacle vehicle 602 is located in the target lane where the autonomous vehicle 601 is going to move onto. In this case, the right-of-way information can be determined according to the traffic rules: the obstacle vehicle 602 has a higher priority.

In another possible implementation, for example, referring to FIG. 7, the autonomous vehicle 701 and the obstacle vehicle 702 are available on the current road, the obstacle vehicle 702 changes the lane, and the autonomous vehicle 701 is located in the target lane where the obstacle vehicle 702 is going to move onto. In this case, the right-of-way information can be determined according to the traffic rules: the autonomous vehicle 701 has a higher priority.

The above described in conjunction with FIGS. 4 to 7 are several possible implementations in the scenario of a non-intersection road. The following is an introduction to several possible implementations in the scenario of a road at intersections.

When it is determined that the autonomous vehicle is located on a road at intersections, it can be determined whether the predicted obstacle vehicle trajectory intersects the lane where the autonomous vehicle is located, and the obstacle prediction line that will not move into the lane where the autonomous vehicle is located, no processing is required.

If it intersects the lane where the autonomous vehicle is located, the turning type of the predicted obstacle vehicle trajectory can be further determined, For example, it can go straight, turn left, and turn right, and then the right-of-way information corresponding to the obstacle trajectory can be determined. The traffic rules of the intersection may include, for example, turning are to yield to straight, vehicle yields to pedestrian, etc. This embodiment does not limit the traffic rules of the intersection.

An exemplary description is currently made in conjunction with FIG. 8, for example, referring to FIG. 8, there are an autonomous vehicle 801 and an obstacle vehicle 802 on the current road, both of which are located at the intersection, and it can be determined currently that the travel trajectory of the obstacle vehicle 802 is that shown as 804 in FIG. 8. It is known from such trajectory that the travel trajectory of the obstacle vehicle 802 and the lane where the autonomous vehicle 801 is located intersect, so it can be further determined that the obstacle vehicle 802 is doing a right turn, the autonomous vehicle 801 is going straight, and the trajectory, for example, may be shown as 803. Therefore, it can be determined that, based on the intersection traffic rules, the right-of-way information is: the autonomous vehicle 801 has a higher priority.

In a possible implementation, intersections, for example, can also be set with traffic lights. For such intersections, in addition to the above determination methods, the right-of-way information can also be determined according to the status of the traffic light. The status of the traffic light, for example, can be determined by the above sensing sensor. For example, obstacle vehicles in the lane corresponding to the red light have the right of way; for the obstacle vehicles in the lane corresponding to the green light, the autonomous vehicle has the right of way; in other words, for intersections with traffic lights, corresponding traffic rules are also set according to the status of the traffic lights, which is not limited in this embodiment.

Another possible scenario is that the vehicle is at a merging intersection, for example, the location of the autonomous vehicle can be determined to find out whether the autonomous vehicle is located on the main road or the side road in the merging area, and the right-of-way information can be determined afterwards according to the traffic rules of the merging intersection.

In a possible implementation, for example, referring to FIG. 9, there are an autonomous vehicle 901 and an obstacle vehicle 902 on the current road, the autonomous vehicle 901 is on the side road, the obstacle vehicle 902 is on the main road, and the autonomous vehicle 901 needs to merge into the main road from the side road. In this case, the right-of-way information can be determined according to the traffic rules: the obstacle vehicle 902 has a higher priority.

In another possible implementation, for example, referring to FIG. 10, there are an autonomous vehicle 1001 and an obstacle vehicle 1002 on the current road, the autonomous vehicle 1001 is on the main road, the obstacle vehicle 1002 is on the side road, and the obstacle vehicle 1002 needs to merge into the main road from the side road. In this case, the right-of-way information can be determined according to the traffic rules: the autonomous vehicle 1001 has a higher priority.

The above introduces several possible implementations of the right-of-way information. In the actual implementation process, the right-of-way information can be determined according to the actual vehicle position relationship and traffic rules, and this embodiment does not specifically limit the specific implementation of the right-of-way information.

S305, respectively determine, a candidate vehicle trajectory corresponding to each of the candidate speed information, where the candidate vehicle trajectory is formed by the vehicle traveling according to both the candidate speed information and the route corresponding to the vehicle within the first preset time period.

In this embodiment, the autonomous vehicle may travel along the planned route; in a possible implementation, the autonomous vehicle may travel along the route planned by the route planning unit of the autonomous vehicle, for example. Therefore, it can be understood that the autonomous vehicle travels along a predetermined route.

During traveling, in addition to the traveling route, it is also necessary to determine the traveling speed. Therefore, based on the traveling trajectory and traveling speed, the trajectory of the autonomous vehicle, containing both the traveling trajectory and the traveling speed, can be obtained.

Based on the above description, it can be determined that at least one piece of candidate speed information will be determined in this embodiment. The candidate speed information may be determined by a speed planning unit in an autonomous vehicle for example, so that it is possible to determine, for each piece of the candidate speed information, the vehicle trajectory formed by the vehicle traveling, within the first preset time period, according to the candidate speed information and the route corresponding to the vehicle, and such vehicle trajectory is determined as the candidate vehicle trajectory corresponding to the candidate speed information. The candidate vehicle trajectory corresponding to each piece of the candidate speed information can be obtained by performing such an operation on each piece of the candidate speed information.

For ease of understanding, the following describes the vehicle trajectory under different speed information with reference to FIG. 11, as shown in FIG. 11, it is assumed that the current vehicle is required to reach location B from location A, for example, at this time, the route planning unit of the autonomous vehicle plans the route shown as 1101 in FIG. 11, the vehicle will travel along this route.

At the same time, it is assumed that there is one piece of candidate speed information for the vehicle, that is: Traveling at a constant speed of 2 m/s within the first preset time period, so the trajectory shown as 1102 in FIG. 11, for example, can be obtained; at the same time, it is also assumed that there is one piece of candidate speed information for the vehicle: traveling at a constant speed of 3 m/s in the first preset period of time, so the trajectory shown as 1103 in FIG. 11, for example, can be obtained; it can be seen that on the same route, if the traveling speed is different, the trajectory formed within the same time duration is also different. Therefore, in this embodiment, the candidate vehicle trajectory corresponding to each piece of candidate speed information can be determined respectively.

S306, sequentially determine, for each candidate vehicle trajectory, whether the obstacle trajectory and the candidate vehicle trajectory intersect; if not, S307 is performed; if yes, S308 is performed.

After the candidate vehicle trajectory corresponding to each piece of candidate speed information is determined, whether the obstacle trajectory and the candidate vehicle trajectory intersect can be determined for each candidate vehicle trajectory.

S307, put a disjoint candidate vehicle trajectory into a first set.

In a possible implementation, referring to FIG. 12, if the obstacle trajectory and the candidate vehicle trajectory do not intersect, it indicates that the autonomous vehicle is traveling according to the current candidate vehicle trajectory, so that in the first preset time period, there is no risk of collision between the autonomous vehicle and the obstacle, which indicates that the current candidate vehicle trajectory can be used. Therefore, the disjoint candidate vehicle trajectory can be put into the first set. In this embodiment, the first set is used to store candidate vehicle trajectories that can be adopted by the vehicle.

S308, determine, according to the right-of-way information corresponding to the obstacle trajectory, a processing result of the candidate vehicle trajectory, where the processing result is to delete the candidate vehicle trajectory, or the processing result is to put the candidate vehicle trajectory into the first set.

In another possible implementation, if the obstacle trajectory and the candidate vehicle trajectory intersect, it indicates that the autonomous vehicle is traveling according to the current candidate vehicle trajectory, the obstacle vehicle is traveling according to the obstacle trajectory, and the autonomous vehicle may collide with the obstacle vehicle in the first preset period of time. In this case, referring to FIG. 12, in this embodiment, the processing result of the candidate vehicle trajectory can be determined according to the right-of-way information corresponding to the obstacle trajectory.

The right-of-way information in this embodiment may indicate that the autonomous vehicle has a higher priority, or it may indicate that an obstacle has a higher priority. Therefore, whether the autonomous vehicle needs to yield can be determined, for example, based on the right-of-way information. Correspondingly, it can be determined whether the candidate vehicle trajectory currently traversed can be used, so as to obtain the processing result of the candidate vehicle trajectory.

As shown in FIG. 12, the processing result can be to delete the candidate vehicle trajectory, for example, when the right-of-way information indicates that the obstacle vehicle has a higher priority, the autonomous vehicle may need to yield, but the obstacle vehicle does not need to yield, so there may be a collision, and in this case, for example, the candidate vehicle trajectory can be deleted; in other words, the probability of collision between the vehicle and the obstacle can be further calculated, and the candidate vehicle trajectory can be deleted when the collision probability is high.

Alternatively, as shown in FIG. 12, the processing result can be to put the candidate vehicle trajectory into the first set; in other words, the vehicle can travel along the current candidate vehicle trajectory, for example, when the right-of-way information indicates that the autonomous vehicle has a higher priority, the obstacle vehicle may need to yield, but the autonomous vehicle does not need to yield, so the collision can be avoided, and in this case, for example, the current candidate vehicle trajectory can be kept, and the candidate vehicle trajectory can be put into the first set.

S309, determine, among the candidate vehicle trajectories contained in the first set, a cost function value corresponding to each candidate vehicle trajectory, and determine a candidate vehicle trajectory with a minimum cost function value as a target vehicle trajectory.

After processing each candidate vehicle trajectory through the above processes, a first set including at least one candidate vehicle trajectory can be obtained, and the target vehicle trajectory adopted by the final autonomous vehicle is selected among the candidate vehicle trajectories contained in the first set.

In a possible implementation, the cost function value corresponding to each candidate vehicle trajectory can be determined, which may be, for example, the cost function value of the candidate speed information corresponding to the candidate vehicle trajectory, the cost function value can be, for example, determined according to the cost function, and the cost function can be understood as an objective function used to find the optimal solution. The specific implementation of the cost function can be selected as required, which is not limited in this embodiment.

After determining the respective cost function values of the candidate vehicle trajectories in the first set, the candidate vehicle trajectory with the minimum cost function value may be determined as the target vehicle trajectory.

S310, determine candidate speed information corresponding to the target vehicle trajectory as target speed information.

In this embodiment, the target speed information is required to be determined from a large amount of candidate speed information. After the target vehicle trajectory is determined, the candidate speed information corresponding to the target vehicle trajectory can be determined as the target speed information.

S311, control the vehicle to travel according to both a route corresponding to the vehicle and the target speed information.

After the target speed information is determined, the vehicle can be controlled to travel according to the planned route and target speed information corresponding to the vehicle.

Understandably, the target speed information determined in this embodiment can guarantee that the autonomous vehicle does not collide with the obstacle, and target speed information is the optimal traveling speed in the candidate speed information; and if a vehicle travels according to the target speed information in this embodiment, unnecessary yielding and deceleration will not occur because the right-of-way information is taken into account, which can effectively improve the intelligence of the vehicle.

The vehicle driving control method provided by the embodiment of the present application, by determining the candidate vehicle trajectory corresponding to the candidate speed information and then based on whether the candidate vehicle trajectory and the obstacle trajectory intersect, put the disjoint candidate vehicle trajectories into the first set, so as to screen out candidate vehicle trajectories that do not have a risk of collision first, which effectively improves the subsequent processing speed; and for the intersecting candidate vehicle trajectories, determine, according to the right-of-way information, whether to put the candidate vehicle trajectory into the first set or delete it, and the determining the processing result of the candidate vehicle trajectory according to the right-of-way information can effectively ensure that the vehicle does not decelerate and yield unnecessarily; then determine, in the first set, the target vehicle trajectory corresponding to the minimum cost function value, and determine the target speed information according to the target vehicle trajectory. In this way, the optimal speed information can be selected among multiple available speed information, which effectively improves the driving performance.

Figure 13:
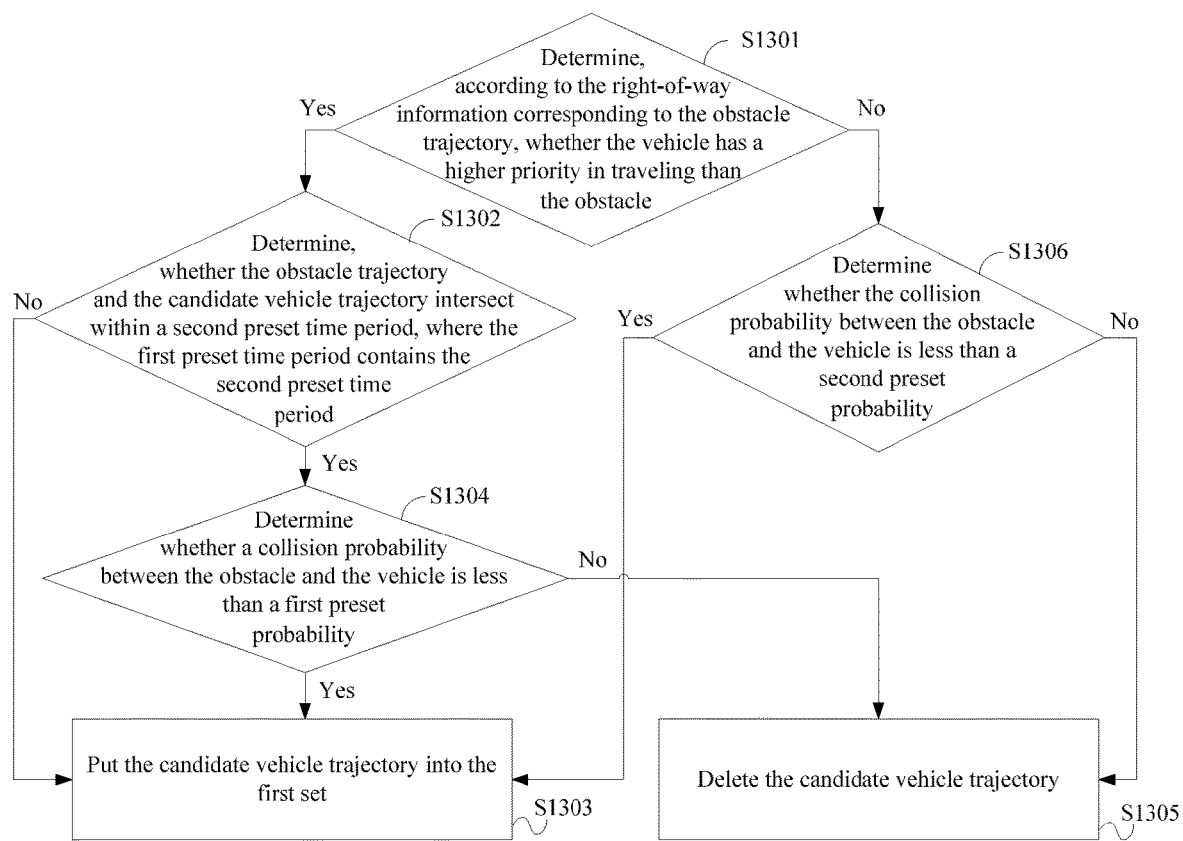
FIG. 13 is flowchart III of a vehicle driving control method according to an embodiment of the present application.

On the basis of the above embodiment, the following describes, in conjunction with FIG. 13, possible implementations of the processing result of determining the candidate vehicle trajectory based on the right-of-way information described above. FIG. 13 is flowchart III of a vehicle driving control method according to an embodiment of the present application.

As shown in FIG. 13, the method includes:

S1301, determine, according to the right-of-way information corresponding to the obstacle trajectory, whether the vehicle has a higher priority in traveling than the obstacle; if yes, S1302 is performed; if not, S1306 is performed.

In this embodiment, the right-of-way information can indicate the priority in traveling of both the vehicle and the obstacle. Therefore, whether the vehicle has a higher priority in traveling than the obstacle should also be determined firstly according to the right-of-way information.

S1302, determine, whether the obstacle trajectory and the candidate vehicle trajectory intersect within a second preset time period, where the first preset time period contains the second preset time period; if not, S1303 is performed; if yes, S1304 is performed.

The premise of this embodiment is to determine that the obstacle trajectory and the candidate vehicle trajectory intersect within the first preset time period. In a possible implementation, if it is determined that the vehicle has a higher priority in traveling than the obstacle, the predicted time duration can be shortened, and it is determined whether the obstacle trajectory and the candidate vehicle trajectory intersect within the second preset time period. The first preset time period in this embodiment contains the second preset time period.

In a possible example, for example, if the first preset time period is a time period of 8 seconds after the current moment, the second preset time period may be, for example, a time period of 4 seconds after the current moment. In other words, the second preset time period is contained in the first preset time period.

S1303, put the candidate vehicle trajectory into the first set.

In a possible implementation, if it is determined that the obstacle trajectory and the candidate vehicle trajectory do not intersect in the second preset time period, it can be determined that the vehicle and the obstacle will not collide in the second preset time period, which indicates that the current candidate vehicle trajectory is available to the vehicle, so the candidate vehicle trajectory can be put into the first set.

Understandably, the obstacle trajectory in this embodiment is predicted. The shorter the prediction time is, the higher the corresponding prediction accuracy is. Therefore, in this embodiment, when it is determined that the obstacle trajectory and the candidate vehicle trajectory will not intersect within the second preset time period, the accuracy rate thereof is relatively high.

Further, the current specific situation is that it is determined that the obstacle trajectory and the candidate vehicle trajectory will intersect in the first preset time period, while they will not intersect in the second preset time period, and the autonomous vehicle has a higher priority than the obstacle trajectory. It can be determined that, based on the current situation, in the second preset time period, the autonomous vehicle will not collide with the obstacle during the second preset time period, and it can be determined that the obstacle vehicle will choose to slow down and give way according to the traffic rules. Therefore, the autonomous vehicle can travel normally without decelerating and yielding. Therefore, in this embodiment, the current candidate vehicle trajectory can be put into the first set.

S1304, determine whether a collision probability between the obstacle and the vehicle is less than a first preset probability; if yes, S1303 is performed; if not, S1305 is performed.

In a possible implementation, if it is determined that the obstacle trajectory and the candidate vehicle trajectory intersect within the second preset time period, it may be determined that the vehicle and the obstacle may collide within the second preset time period. Since the prediction time has been shortened, but the collision may still occur, the collision probability between the obstacle and the vehicle needs to be determined in this case.

In a possible implementation, the intersection time and intersection position between the obstacle trajectory and the candidate vehicle trajectory can be determined, and then the collision probability between the obstacle and the vehicle is determined according to the current speed of the vehicle, the current traveling speed of the obstacle, the intersection time, and the intersection position.

Methods for calculating collision risk include but are not limited to: Time-To-Collision (TTC), Distance-To-Collision (DTC) or Time-To-React (TTR).

In this embodiment, it can be determined whether the collision probability between the obstacle and the vehicle is greater than or equal to the first preset probability. The first preset probability in this embodiment is a preset probability set for the situation where the vehicle has a higher priority in traveling, and the specific setting method of the preset probability can be selected as required, which is not limited in this embodiment.

In a possible implementation, if it is determined that the collision probability between the obstacle and the vehicle is less than the first preset probability, it can be determined that the collision probability between the vehicle and the obstacle is not high, because the current vehicle has a higher priority in traveling, so it can be determined that the vehicle can follow the current candidate vehicle trajectory, so that the current candidate vehicle trajectory can be put into the first set.

S1305, delete the candidate vehicle trajectory.

In another possible implementation, if it is determined that the collision probability between the obstacle and the vehicle is greater than or equal to the first preset probability, it can be determined that the collision probability between the vehicle and the obstacle is relatively high; in this case, although the vehicle has a higher priority in traveling, the vehicle cannot be controlled to use the current candidate vehicle trajectory for safety reasons, thus the candidate vehicle trajectory is required to be deleted.

S1306, determine whether the collision probability between the obstacle and the vehicle is less than a second preset probability; if yes, S1303 is performed; if not, S1305 is performed.

In another possible implementation, if it is determined that the obstacle has a higher priority in traveling than the vehicle and the premise of this embodiment is to determine that the obstacle trajectory and the candidate vehicle trajectory intersect within the first preset time period, the collision probability between the obstacle and the vehicle can be determined in the current situation, and the implementation method of determining the collision probability is the same as that described above, and will not be repeated herein.

In this embodiment, it can be determined whether the collision probability between the obstacle and the vehicle is greater than or equal to the second preset probability, where the second preset probability is set for the situation where the obstacle has a higher priority in traveling, and the specific setting method thereof can be selected as required, which is not limited in this embodiment. The second preset probability may be the same as or be different from the first preset probability described above, which is not limited in this embodiment.

In a possible implementation, if it is determined that the collision probability between the obstacle and the vehicle is greater than or equal to the second preset probability, it can be determined that the collision probability between the obstacle and the vehicle is greater, and the obstacle has a higher priority in traveling currently, it is considered that the autonomous vehicle cannot follow the current candidate vehicle trajectory, so the candidate vehicle trajectory can be deleted.

In another possible implementation, if it is determined that the collision probability between the obstacle and the vehicle is less than the second preset probability, it can be determined that the collision risk between the obstacle and the vehicle is relatively small, and then it can be determined that the vehicle can follow the current candidate vehicle trajectory, so the candidate vehicle trajectory can be put into the first set.

On the premise that it is determined that the autonomous vehicle and the obstacle will intersect within the first preset period of time, the vehicle driving control method provided in this embodiment first determines the priorities in traveling of both the obstacle and the autonomous vehicle based on the right-of-way information, then shortens the prediction time when the priority of autonomous vehicles is higher, so as to determine whether the autonomous vehicle and the obstacle will intersect within the shortened second preset time period; by shortening the prediction time, the prediction accuracy of trajectory can be improved; and this method determines, when it is determined that the autonomous vehicle and the obstacle will still intersect within the second preset time period, whether the candidate trajectory should be deleted or used as a candidate according to the collision probability, the candidate trajectory whose collision probability is less than the preset threshold can be effectively retained in this way, thereby ensuring that under the premise that no collision occurs, the candidate vehicle trajectory is retained as much as possible, so as to avoid removing some reasonable vehicle trajectories from the beginning; and select the optimal target vehicle trajectory from the reserved candidate vehicle trajectories, thereby avoiding unreasonable yielding and deceleration of the vehicle, so as to effectively improve the rationality of the vehicle traveling.

Figure 14:
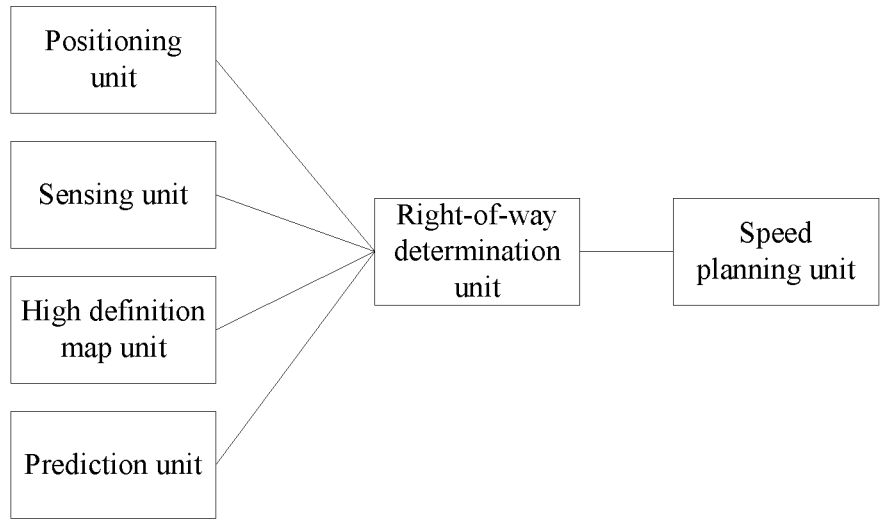
FIG. 14 is a schematic diagram of a processing unit for performing a vehicle driving control method according to an embodiment of the present application.

Based on the above embodiment, the following describes the vehicle driving control method provided by the present application in conjunction with FIG. 14. FIG. 14 is a schematic diagram of a processing unit for performing a vehicle driving control method according to an embodiment of the present application.

The positioning unit can obtain the position of the autonomous vehicle.

The sensing unit can obtain the position and speed of the obstacle, as well as the status of traffic lights.

The high definition map unit can obtain the attributes of the road where the vehicle and the obstacle are located.

The prediction unit can obtain the prediction trajectory of the obstacle within a certain period of time, and obtain the obstacle trajectory corresponding to the obstacle.

The right-of-way calculation unit can determine the right-of-way information of the obstacle trajectory according to both the information determined by the above four units and the traffic rules; understandably, there can be multiple obstacles on the road, and the right-of-way information can be added to the obstacle trajectory corresponding to each obstacle.

After obtaining the right-of-way information corresponding to the obstacle trajectory, the speed planning unit of this embodiment can determine, according to both the right-of-way information and the content introduced in the above embodiment, the target speed information in at least one piece of candidate speed information, and then controls the vehicle to travel according to the corresponding route and target speed information of the vehicle.

By planning the vehicle speed in combination with the right-of-way information, unnecessary deceleration and braking of the vehicle can be effectively avoided, thereby effectively improving the rationality of vehicle traveling.

Figure 15:
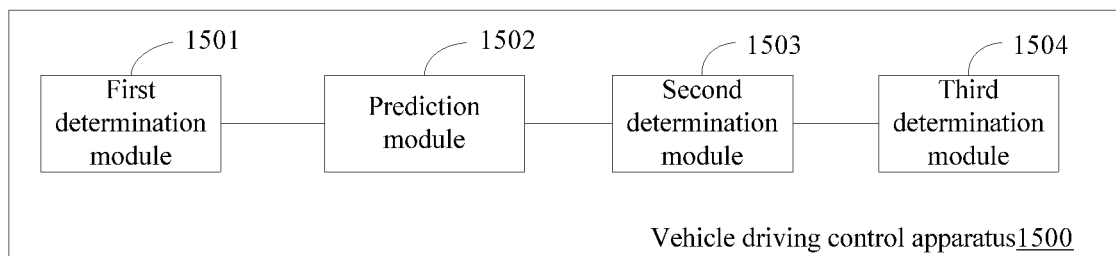
FIG. 15 is a schematic structural diagram of a vehicle driving control apparatus according to an embodiment of the present application.

FIG. 15 is a schematic structural diagram of a vehicle driving control apparatus according to an embodiment of the present application. As shown in FIG. 15, the vehicle driving control apparatus 1500 of this embodiment may include: a first determination module 1501, a prediction module 1502, a second determination module 1503, and a third determination module 1504.

The first determination module 1501 is configured to determine, according to driving data of a vehicle, at least one piece of candidate speed information of the vehicle, where the candidate speed information is used to indicate traveling speed of the vehicle at each moment in a first preset time period.

The prediction module 1502 is configured to predict, according to movement data of an obstacle on a road, an obstacle trajectory of the obstacle in the first preset time period.

The second determination module 1503 is configured to determine right-of-way information corresponding to the obstacle trajectory, where the right-of-way information is used to indicate a priority in traveling of both the vehicle and the obstacle.

The third determination module 1504 is configured to determine target speed information in the at least one piece of candidate speed information according to both the right-of-way information corresponding to the obstacle trajectory and the obstacle trajectory, and control the vehicle to travel according to both a route corresponding to the vehicle and the target speed information.

In a possible implementation, the third determination module 1504 includes:
 a first determination unit, configured to respectively determine a candidate vehicle trajectory corresponding to each of the candidate speed information, where the candidate vehicle trajectory is formed by the vehicle traveling according to both the candidate speed information and the route corresponding to the vehicle within the first preset time period;
 a second determination unit, configured to determine, according to the right-of-way information corresponding to the obstacle trajectory and the obstacle trajectory, a target vehicle trajectory in each candidate vehicle trajectory; and
 a third determining unit, configured to determine candidate speed information corresponding to the target vehicle trajectory as the target speed information.

In a possible implementation, the second determination unit is specifically configured to:
 sequentially determine, for each candidate vehicle trajectory, whether the obstacle trajectory and the candidate vehicle trajectory intersect;
 if there is no intersection, put the disjoint candidate vehicle trajectory into a first set;
 if there is an intersection, determine, according to both the right-of-way information corresponding to the obstacle trajectory and the obstacle trajectory, a processing result of the candidate vehicle trajectory, where the processing result is to delete the candidate vehicle trajectory, or the processing result is to put the candidate vehicle trajectory into the first set; and
 determine, among the candidate vehicle trajectories contained in the first set, a cost function value corresponding to each candidate vehicle trajectory, and determine the candidate vehicle trajectory with a minimum cost function value as the target vehicle trajectory.

In a possible implementation, the second determination unit is specifically configured to:
 if it is determined that, according to the right-of-way information corresponding to the obstacle trajectory, the vehicle has a higher priority in traveling than the obstacle, determine whether the obstacle trajectory and the candidate vehicle trajectory intersect within a second preset time period, where the first preset time period contains the second preset time period;
 put the candidate vehicle trajectory into the first set if there is no intersection;
 determine a collision probability between the obstacle and the vehicle if there is an intersection;
 delete the candidate vehicle trajectory if the collision probability is greater than or equal to a first preset probability; and
 put the candidate vehicle trajectory into the first set if the collision probability is less than the first preset probability.

In a possible implementation, the second determination unit is specifically configured to:
 if it is determined that, according to the right-of-way information corresponding to the obstacle trajectory, the obstacle has a higher priority in traveling than the vehicle, determine a collision probability between the obstacle and the vehicle;
 delete the candidate vehicle trajectory if the collision probability is greater than or equal to a second preset probability; and
 put the candidate vehicle trajectory into the first set if the collision probability is less than the second preset probability.

In a possible implementation, the second determination unit is specifically configured to: determine intersection time and intersection position between the obstacle trajectory and the candidate vehicle trajectory; and
 determine the collision probability according to current traveling speed of the vehicle, current traveling speed of the obstacle, the intersection time, and the intersection position.

In a possible implementation, the driving data of the vehicle includes at least one of the following: current traveling speed of the vehicle, a maximum acceleration of the vehicle, and a minimum acceleration of the vehicle;
 the first determination module 1501 is specifically configured to:
 determine, according to the current traveling speed of the vehicle, the maximum acceleration of the vehicle, and the minimum acceleration of the vehicle, at least one traveling speed of the vehicle at each moment within the first preset time period; and
 combine the at least one traveling speed of the vehicle at each moment to obtain the at least one piece of candidate speed information of the vehicle.

In a possible implementation, the second determination module 1503 is specifically configured to:
 determine, according to both position relationship between the vehicle and the obstacle and traffic rules, the right-of-way information corresponding to the obstacle trajectory.

The present application provides a vehicle driving control method and apparatus, which are applied to the field of autonomous driving in computer technology, so as to improve the driving rationality of autonomous vehicles.

According to an embodiment of the present application, the present application also provides an electronic device and a readable storage medium.

According to an embodiment of the present application, the present application also provides a computer program product, including: a computer program, which is stored in a readable storage medium, at least one processor of an electronic device can read the computer program from the readable storage medium, and the at least one processor executes the computer program to cause the electronic device perform the solution provided in any of the above embodiments.

Figure 16:
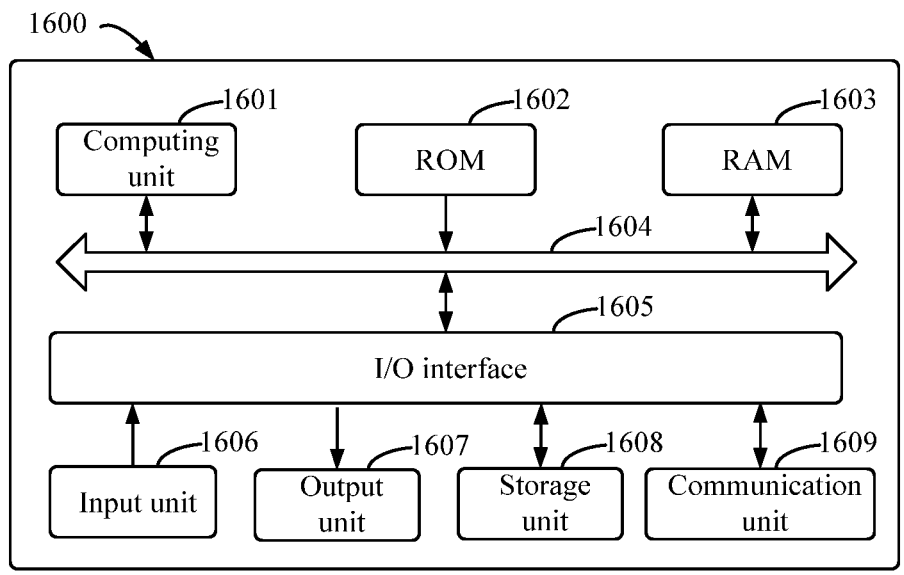
FIG. 16 is a block diagram of an electronic device used to implement the driving control method according to an embodiment of the present application.

FIG. 16 is a block diagram of an example electronic device 1600 used to implement the embodiment of the present application. The electronic device is intended to represent various forms of digital computers, such as the laptop computer, desktop computer, workstation, personal digital assistant, server, blade server, mainframe computer, and other suitable computers. The electronic device can also represent various forms of mobile apparatuses, such as the personal digital assistant, cellular phone, smart phone, wearable device, and other similar computing apparatuses. The components shown herein, their connections and relationships, and their functions are merely examples, and are not intended to limit the implementation of the present disclosure described and/or required herein.

As shown in FIG. 16, the electronic device 1600 includes a computing unit 1601, which may perform various appropriate actions and processing according to a computer program stored in a read only memory (ROM) 1602 or a computer program loaded from the storage unit 1608 into a random access memory (RAM) 1603. In the RAM 1603, various programs and data required for the operation of the electronic device 1600 can also be stored. The computing unit 1601, ROM 1602, and RAM 1603 are connected to each other through a bus 1604. An input/output (I/O) interface 1605 is also connected to the bus 1604.

Multiple components in the electronic device 1600 are connected to the I/O interface 1605, including: an input unit 1606, such as a keyboard, a mouse, etc.; an output unit 1607, such as various types of displays, speakers, etc.; and a storage unit 1608, such as a magnetic disk, an optical disk, etc.; and a communication unit 1609, such as a network card, a modem, a wireless communication transceiver, etc. The communication unit 1609 allows the electronic device 1600 to exchange information/data with other devices through a computer network such as the Internet and/or various telecommunication networks.

The computing unit 1601 may be various general-purpose and/or special-purpose processing components with processing and computing capabilities. Some examples of the computing unit 1601 include, but are not limited to, central processing unit (CPU), graphics processing unit (GPU), various dedicated artificial intelligence (AI) computing chips, various computing units that run machine learning model algorithms, digital signal processor (DSP), and any appropriate processor, controller, microcontroller, etc. The computing unit 1601 performs the various methods and processing described above, for example, a vehicle driving control method. For example, in some embodiments, the vehicle driving control method may be implemented as a computer software program, which is tangibly contained in a machine-readable medium, such as the storage unit 1608. In some embodiments, part or the entire computer program may be loaded and/or installed on the electronic device 1600 via the ROM 1602 and/or the communication unit 1609. When the computer program is loaded into the RAM 1603 and executed by the computing unit 1601, one or more steps of the vehicle driving control method described above can be performed. Alternatively, in other embodiments, the computing unit 1601 may be configured to perform, in any other suitable manner (for example, by means of firmware), the vehicle driving control method.

Various implementations of the systems and technologies described herein can be implemented in the digital electronic circuit system, integrated circuit system, field programmable gate array (FPGA), application specific integrated circuit (ASIC), application-specific standard product (ASSP), system-on-chip system (SOC), complex programmable logic device (CPLD), computer hardware, firmware, software, and/or combinations thereof. These various implementations may include: being implemented in one or more computer programs. The one or more computer programs may be executed and/or interpreted on a programmable system including at least one programmable processor, the programmable processor may be a dedicated or general programmable processor, may receive data and instructions from a storage system, at least one input apparatus, and at least one output apparatus, and transmit data and instructions to the storage system, the at least one input apparatus and the at least one output apparatus.

The program code used to implement the method of the present disclosure can be written in any combination of one or more programming languages. These program codes can be provided to the processor or controller of general-purpose computer, special-purpose computer, or other programmable data processing apparatuses, so that when the program codes are executed by the processor or controller, the functions/operations specified in the flowchart and/or block diagram are implemented. The program code can be executed entirely on the machine, partly on the machine, partly on the machine serving as an independent software package, partly on the machine and partly on the remote machine, or completely on the remote machine or server.

In the context of the present disclosure, a machine-readable medium may be a tangible medium, which may contain or store programs for use by the instruction execution system, apparatus, or device, or the machine-readable medium may include the program used in conjunction with the instruction execution system, apparatus, or device. The machine-readable medium may be a machine-readable signal medium or a machine-readable storage medium. The machine-readable medium may include, but is not limited to, an electronic, magnetic, optical, electromagnetic, infrared, or semiconductor system, apparatus, or device, or be any suitable combination of the above. More specific examples of machine-readable storage media would include electrical connections based on one or more wires, portable computer disks, hard disks, random access memory (RAM), read-only memory (ROM), erasable programmable read-only memory (EPROM or flash memory), optical fiber, portable compact disk read-only memory (CD-ROM), optical storage device, magnetic storage device, or any appreciate combination of the above.

In order to provide interaction with users, the systems and techniques described here can be implemented on a computer, and the computer has: a display apparatus (for example, a cathode ray tube (CRT) or liquid crystal display (LCD) monitor) for displaying information to the user; as well as a keyboard and a pointing apparatus (for example, a mouse or a trackball), the user can provide input to the computer through the keyboard and the pointing apparatus. Other types of apparatuses can also be used to provide interaction with users; for example, the feedback provided to the user can be any form of sensory feedback (for example, visual feedback, auditory feedback or tactile feedback); and any form (including sound input, voice input or tactile input) can be used to receive input from the user.

The systems and technologies described herein can be implemented in a computing system that includes back-end components (for example, as a data server), or a computing system that includes middleware components (for example, an application server), or a computing system that includes front-end components (for example, a user computer with a graphical user interface or web browser, through which the user can interact with the implementation of the system and technology described herein), or a computing system that includes any combination of such back-end components, middleware components, or front-end components. The components of the system can be connected to each other through any form or medium of digital data communication (for example, a communication network). Examples of communication networks include: local area network (LAN), wide area network (WAN) and the Internet.

The computer system can include clients and servers. The client and server are generally far away from each other and usually interact through a communication network. The relationship between the client and the server is generated through computer programs running on the corresponding computers and having a client-server relationship with each other. The server can be a cloud server, also referred to as a cloud computing server or a cloud host, which is a host product in the cloud computing service system, so as to solve the shortcomings of difficult management and weak business scalability in traditional physical hosts and VPS services ("Virtual Private Server", or "VPS" for short). The server can also be a server of a distributed system, or a server combined with a block chain.

Understanding that the various forms of processes shown above can be used to reorder, add or delete steps. For example, the steps described in the present application can be performed in parallel, sequentially, or in a different order, as long as the desired result of the technical solution disclosed in the present application can be achieved, which is not limited herein.

The above specific implementations do not constitute a limitation on the scope of protection of the present application. Those skilled in the art should understand that various modifications, combinations, sub-combinations, and substitutions can be made according to design requirements and other factors. Any amendments, equivalent substitutions and improvements made within the spirit and principles of the present application shall be included in the scope of protection of the present application.

What is claimed is:

1. A vehicle driving control method, comprising:
   determining, according to driving data of a vehicle, at least one piece of candidate speed information of the vehicle, wherein the at least one piece of candidate speed information is used to indicate traveling speed of the vehicle at each moment in a first preset time period;
   predicting, according to movement data of an obstacle on a road, an obstacle trajectory of the obstacle in the first preset time period;
   determining right-of-way information corresponding to the obstacle trajectory, wherein the right-of-way information is used to indicate a priority in traveling of both the vehicle and the obstacle;
   determining target speed information in the at least one piece of candidate speed information according to both the right-of-way information corresponding to the obstacle trajectory and the obstacle trajectory, wherein the determining target speed information in the at least one piece of candidate speed information according to both the right-of-way information corresponding to the obstacle trajectory and the obstacle trajectory, comprises:
   respectively determining a candidate vehicle trajectory corresponding to each of the candidate speed information, wherein the candidate vehicle trajectory is formed by the vehicle traveling according to both the candidate speed information and the route corresponding to the vehicle within the first preset time period;
   determining, according to the right-of-way information corresponding to the obstacle trajectory and the obstacle trajectory, a target vehicle trajectory in each candidate vehicle trajectory; and
   determining candidate speed information corresponding to the target vehicle trajectory as the target speed information; and
   controlling the vehicle to travel according to both a route corresponding to the vehicle and the target speed information.

2. The method according to claim 1, wherein the determining, according to the right-of-way information corresponding to the obstacle trajectory and the obstacle trajectory, a target vehicle trajectory in each candidate vehicle trajectory, comprises:
   sequentially determining, for each candidate vehicle trajectory, whether the obstacle trajectory and the candidate vehicle trajectory intersect;
   putting a disjoint candidate vehicle trajectory into a first set if there is no intersection;
   determining, according to both the right-of-way information corresponding to the obstacle trajectory and the obstacle trajectory, a processing result of the candidate vehicle trajectory if there is an intersection, wherein the processing result is to delete the candidate vehicle trajectory, or the processing result is to put the candidate vehicle trajectory into the first set; and
   determining, among the candidate vehicle trajectories contained in the first set, a cost function value corresponding to each candidate vehicle trajectory, and determining the candidate vehicle trajectory with a minimum cost function value as the target vehicle trajectory.

3. The method according to claim 2, wherein the determining, according to both the right-of-way information corresponding to the obstacle trajectory and the obstacle trajectory, a processing result of the candidate vehicle trajectory, comprises:
   if it is determined that, according to the right-of-way information corresponding to the obstacle trajectory, the vehicle has a higher priority in traveling than the obstacle, determining whether the obstacle trajectory and the candidate vehicle trajectory intersect within a second preset time period, wherein the first preset time period contains the second preset time period;
   putting the candidate vehicle trajectory into the first set if there is no intersection;
   determining a collision probability between the obstacle and the vehicle if there is an intersection;
   deleting the candidate vehicle trajectory if the collision probability is greater than or equal to a first preset probability; and
   putting the candidate vehicle trajectory into the first set if the collision probability is less than the first preset probability.

4. The method according to claim 3, wherein the determining a collision probability between the obstacle and the vehicle, comprises:
   determining intersection time and intersection position between the obstacle trajectory and the candidate vehicle trajectory; and
   determining the collision probability according to current traveling speed of the vehicle, current traveling speed of the obstacle, the intersection time and the intersection position.

5. The method according to claim 4, wherein the driving data of the vehicle comprises at least one of: current traveling speed of the vehicle, a maximum acceleration of the vehicle, and a minimum acceleration of the vehicle;

the determining, according to driving data of a vehicle, at least one piece of candidate speed information of the vehicle, comprises:

determining, according to the current traveling speed of the vehicle, the maximum acceleration of the vehicle and the minimum acceleration of the vehicle, at least one traveling speed of the vehicle at each moment within the first preset time period; and combining the at least one traveling speed of the vehicle at each moment to obtain the at least one piece of candidate speed information of the vehicle.

6. The method according to claim 3, wherein the driving data of the vehicle comprises at least one of: current traveling speed of the vehicle, a maximum acceleration of the vehicle, and a minimum acceleration of the vehicle;

the determining, according to driving data of a vehicle, at least one piece of candidate speed information of the vehicle, comprises:

determining, according to the current traveling speed of the vehicle, the maximum acceleration of the vehicle and the minimum acceleration of the vehicle, at least one traveling speed of the vehicle at each moment within the first preset time period; and combining the at least one traveling speed of the vehicle at each moment to obtain the at least one piece of candidate speed information of the vehicle.

7. The method according to claim 3, wherein the determining right-of-way information corresponding to the obstacle trajectory, comprises:

determining, according to both position relationship between the vehicle and the obstacle and traffic rules, the right-of-way information corresponding to the obstacle trajectory.

8. The method according to claim 2, wherein the determining, according to both the right-of-way information corresponding to the obstacle trajectory and the obstacle trajectory, a processing result of the candidate vehicle trajectory, comprises:

if it is determined that, according to the right-of-way information corresponding to the obstacle trajectory, the obstacle has a higher priority in traveling than the vehicle, determining a collision probability between the obstacle and the vehicle;

deleting the candidate vehicle trajectory if the collision probability is greater than or equal to a second preset probability; and putting the candidate vehicle trajectory into the first set if the collision probability is less than the second preset probability.

9. The method according to claim 8, wherein the determining a collision probability between the obstacle and the vehicle, comprises:

determining intersection time and intersection position between the obstacle trajectory and the candidate vehicle trajectory; and determining the collision probability according to current traveling speed of the vehicle, current traveling speed of the obstacle, the intersection time and the intersection position.

10. The method according to claim 8, wherein the driving data of the vehicle comprises at least one of: current traveling speed of the vehicle, a maximum acceleration of the vehicle, and a minimum acceleration of the vehicle;

the determining, according to driving data of a vehicle, at least one piece of candidate speed information of the vehicle, comprises:

determining, according to the current traveling speed of the vehicle, the maximum acceleration of the vehicle and the minimum acceleration of the vehicle, at least one traveling speed of the vehicle at each moment within the first preset time period; and combining the at least one traveling speed of the vehicle at each moment to obtain the at least one piece of candidate speed information of the vehicle.

11. The method according to claim 8, wherein the determining right-of-way information corresponding to the obstacle trajectory, comprises:

determining, according to both position relationship between the vehicle and the obstacle and traffic rules, the right-of-way information corresponding to the obstacle trajectory.

12. The method according to claim 2, wherein the driving data of the vehicle comprises at least one of current traveling speed of the vehicle, a maximum acceleration of the vehicle, and a minimum acceleration of the vehicle;

the determining, according to driving data of a vehicle, at least one piece of candidate speed information of the vehicle, comprises:

determining, according to the current traveling speed of the vehicle, the maximum acceleration of the vehicle and the minimum acceleration of the vehicle, at least one traveling speed of the vehicle at each moment within the first preset time period; and combining the at least one traveling speed of the vehicle at each moment to obtain the at least one piece of candidate speed information of the vehicle.

13. The method according to claim 2, wherein the determining right-of-way information corresponding to the obstacle trajectory, comprises:

determining, according to both position relationship between the vehicle and the obstacle and traffic rules, the right-of-way information corresponding to the obstacle trajectory.

14. The method according to claim 1, wherein the driving data of the vehicle comprises at least one of: current traveling speed of the vehicle, a maximum acceleration of the vehicle, and a minimum acceleration of the vehicle;

the determining, according to driving data of a vehicle, at least one piece of candidate speed information of the vehicle, comprises:

determining, according to the current traveling speed of the vehicle, the maximum acceleration of the vehicle and the minimum acceleration of the vehicle, at least one traveling speed of the vehicle at each moment within the first preset time period; and combining the at least one traveling speed of the vehicle at each moment to obtain the at least one piece of candidate speed information of the vehicle.

15. The method according to claim 1, wherein the driving data of the vehicle comprises at least one of current traveling speed of the vehicle, a maximum acceleration of the vehicle, and a minimum acceleration of the vehicle;

the determining, according to driving data of a vehicle, at least one piece of candidate speed information of the vehicle, comprises:

determining, according to the current traveling speed of the vehicle, the maximum acceleration of the vehicle and the minimum acceleration of the vehicle, at least one traveling speed of the vehicle at each moment within the first preset time period: and combining the at least one traveling speed of the vehicle at each moment to obtain the at least one piece of candidate speed information of the vehicle.

16. The method according to claim 1, wherein the determining right-of-way information corresponding to the obstacle trajectory, comprises:
determining, according to both position relationship between the vehicle and the obstacle and traffic rules, the right-of-way information corresponding to the obstacle trajectory.

17. The method according to claim 1, wherein the determining right-of-way information corresponding to the obstacle trajectory, comprises:
determining, according to both position relationship between the vehicle and the obstacle and traffic rules, the right-of-way information corresponding to the obstacle trajectory.

18. A vehicle driving control apparatus, comprising:
a memory; and
a processor,
wherein a computer program stored on the memory and operable on the processor,
wherein the processor, when running the computer program, is configured to:
determine, according to driving data of a vehicle, at least one piece of candidate speed information of the vehicle, wherein the at least one piece of candidate speed information is used to indicate traveling speed of the vehicle at each moment in a first preset time period;
predict, according to movement data of an obstacle on a road, an obstacle trajectory of the obstacle in the first preset time period;
determine right-of-way information corresponding to the obstacle trajectory, wherein the right-of-way information is used to indicate a priority in traveling of both the vehicle and the obstacle; and
determine target speed information in the at least one piece of candidate speed information according to both the right-of-way information corresponding to the obstacle trajectory and the obstacle trajectory, wherein the determining target speed information in the at least one piece of candidate speed information according to both the right-of-way information corresponding to the obstacle trajectory and the obstacle trajectory, comprises:
respectively determining a candidate vehicle trajectory corresponding to each of the candidate speed information, wherein the candidate vehicle trajectory is formed by the vehicle traveling according to both the candidate speed information and the route corresponding to the vehicle within the first preset time period;
determining, according to the right-of-way information corresponding to the obstacle trajectory and the obstacle trajectory, a target vehicle trajectory in each candidate vehicle trajectory; and
determining candidate speed information corresponding to the target vehicle trajectory as the target speed information; and
control the vehicle to travel according to both a route corresponding to the vehicle and the target speed information.

19. A non-transitory computer-readable storage medium having stored therein computer instructions, wherein the computer instructions are used to cause a computer to perform the method according to claim 1.

* * * * *